US 6,666,631 B2

(12) United States Patent
Yajima et al.

(10) Patent No.: US 6,666,631 B2
(45) Date of Patent: Dec. 23, 2003

(54) ELECTRODE TIP DRESSING APPARATUS

(75) Inventors: Teruhiko Yajima, Tokyo (JP); Kensuke Sakai, Tokyo (JP); Kenji Oda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 120 days.

(21) Appl. No.: 09/945,356

(22) Filed: Aug. 31, 2001

(65) Prior Publication Data

US 2002/0044847 A1 Apr. 18, 2002

(30) Foreign Application Priority Data

| Sep. 7, 2000 | (JP) | 2000-272038 |
| Nov. 30, 2000 | (JP) | 2000-364724 |
| Dec. 28, 2000 | (JP) | 2000-402680 |
| Jul. 19, 2001 | (JP) | 2001-220343 |

(51) Int. Cl.[7] ............................................... B23C 3/00
(52) U.S. Cl. ........................................ 409/137; 409/140
(58) Field of Search ................................ 409/137, 139, 409/140; 408/67; 451/443, 453

(56) References Cited

U.S. PATENT DOCUMENTS

| 4,514,936 | A | * | 5/1985 | Hurtado ........................ 451/28 |
| 4,896,014 | A | * | 1/1990 | Sakai et al. ................. 219/91.2 |
| 5,332,342 | A | | 7/1994 | Kizaki et al. ................ 409/140 |
| 5,951,219 | A | * | 9/1999 | Stadtfeld et al. ............ 409/131 |
| 6,106,203 | A | * | 8/2000 | Asmis et al. ................ 409/137 |
| 2003/0002944 | A1 | * | 1/2003 | Kobayashi et al. ......... 409/137 |
| 2003/0002945 | A1 | * | 1/2003 | Sunaga et al. .............. 409/140 |

FOREIGN PATENT DOCUMENTS

| DE | 19825771 | 12/1999 |
| EP | 0171113 | 2/1986 |
| JP | 59127979 | 7/1984 |
| JP | 06122082 | 5/1994 |

* cited by examiner

Primary Examiner—Daniel W. Howell
(74) Attorney, Agent, or Firm—Darby & Darby

(57) ABSTRACT

In the electrode tip dressing apparatus, the upper surface and the lower surface of a dressing body is covered with an upper chip capturing case and a lower chip capturing case so that the chips generated when electrode tips are dressed by polishing or grinding are prevented from scattering to the outside, whereby a chip collection efficiency can be increased.

5 Claims, 27 Drawing Sheets

ELECTRODE TIP DRESSING APPARATUS

This application claims benefit of Japanese Application Nos. 2000-272038 filed on Sep. 7, 2000, 2000-364724 filed on Nov. 30, 2000, 2000-402680 filed on December 28, and 2001-220343 filed on Jul. 19, 2001, the contents of which are incorporated by this reference.

BACKGROUND OF THE INVENTION

1. Field of the Invention

The present invention relates to an electrode tip dressing apparatus of welding machines capable of effectively collecting chips generated when an electrode tip is dressed.

2. Description the Related Aft

Hitherto, an electrode tip used for spot welding is worn (subjected to deformation and abrasion) when a welding work is repeatedly carried out by using the electrode tip. When the welding work is executed by using a worn electrode tip, a desired quality of the welding work cannot be obtained. Thus, the electrode tip is periodically cleaned by dressing to maintain the quality of the welding work.

For example, Japanese Patent Unexamined Publication No. 6-122082 discloses an art for dressing electrode tips in such a manner that the upper and lower surfaces of a dresser are clamped under a pressure between a pair of electrode tips oppositely disposed at both ends of a welding gun and then the electrode tips are dressed by polishing when the welding gun is swung about an axial center of the electrode tips.

By the way, it is recently studied to recycle the chips from a view point of reducing a material cost and environmental problems. For this purpose, a collection vessel is disposed below the dresser so as to reuse the chips collected in the collection vessel.

However, since the chip is liable to be scattered by relative swing motions between the dresser and the electrode tip or by a rotation thereof in a polishing work, all the chips can not be collected in the collection vessel, which causes problems that a chip collection efficiency is low.

Moreover, when air is blown to the dresser to prevent the chips from clogging therein, the chips are scattered by the air blown thereto, which further reduces the chip collection efficiency.

Incidentally, a copper is often as used as a material of the electrode tip for the spot welding. However, the electrode tip is ground more frequently to maintain a proper quality of the welding works, and an amount of ground or polished chips of the electrode tip is increased thereby. Thus, it is necessary to increase a chip collection rate (efficiency) and to effectively reuse the chips to reduce a material cost.

SUMMARY OF THE INVENTION

An object of the present invention is to provide a newly-developed electrode tip dressing apparatus capable of increasing a collection rate of chips which are generated when an electrode tip is dressed by polishing or grinding and of improving a recycle rate of the chips.

An electrode tip dressing apparatus of the present invention for dressing a pair of electrode tips arranged in confrontation with each other includes a dressing body having upper and lower surfaces clamped under pressure by said pair of electrode tips for dressing said pair of electrode tips through a relatively sliding motion thereof with said electrode tips; a chip capturing case for covering said dressing body and having a tip inserting port through which at least one of said electrode tips is inserted; and a shield member disposed to the tip inserting port of said chip capturing case.

According to this arrangement, the dressing body is covered with the chip capturing cases, the tip insertion ports into which the electrode tips are inserted are formed to the chip capturing cases, and the shield members are disposed to the tip insertion ports. Accordingly, the chips generated when the electrode tips are dressed can be collected in the chip capturing cases without scattering them to the outside.

The above and other objects, features and advantages of the invention will become more clearly understood from the following description referring to the accompanying drawings.

BRIEF DESCRIPTION OF THE DRAWINGS

FIGS. 1 to 7 relate to a first embodiment of the present invention, wherein:

FIG. 1 is a perspective view of an electrode tip dressing apparatus;

FIG. 2 is a front elevational view of the electrode tip dressing apparatus;

FIG. 3 is a sectional view of the electrode tip dressing apparatus taken along the line III—III of FIG. 2;

FIG. 4 is a plan view of the electrode tip dressing apparatus shown in FIG. 2;

FIG. 5 is a view explaining a state in which welding gun arms are moved to the electrode tip dressing apparatus;

FIG. 6 is a view explaining a state in which the gun arms are faced to a lower case;

FIG. 7 is a view showing a state when the electrode tips are dressed;

FIGS. 9 to 17 relate to a third embodiment of the present invention, wherein:

FIG. 9 is a perspective view of the electrode tip dressing apparatus;

FIG. 10 is a front elevational view of the electrode tip dressing apparatus;

FIG. 11 is a sectional view of the electrode tip dressing apparatus taken along the line XI—XI of FIG. 10;

FIG. 12 is a plan view of the electrode tip dressing apparatus;

FIG. 13 is a sectional view of the electrode tip dressing apparatus taken along the line XIII—XIII of FIG. 10;

FIG. 14 is a rear elevational view of the main portion of a chip capturing case;

FIG. 15 is a view explaining a state in which the gun arms are moved to the electrode tip dressing apparatus;

FIG. 16 is a view explaining a state in which the gun arms are faced to the chip capturing case;

FIG. 17 is a view explaining a state in which the electrode tips are dressed;

FIGS. 18 to 22 relate to a fourth embodiment of the present invention, wherein:

FIG. 18 is a front elevational view of the electrode tip dressing apparatus;

FIG. 19 is side elevational, view partly in cross section, of the electrode tip dressing apparatus;

FIG. 20 is a plan view of the electrode tip dressing apparatus;

FIG. 21 is perspective view of a chip capturing case;

FIG. 22 is perspective view of the chip capturing case according to a different mode;

FIGS. 23 to 27 relate to a fifth embodiment of the present invention, wherein:

FIG. 23 is a perspective view of the electrode tip dressing apparatus;

FIG. 24 is an exploded perspective view of the main portion of the electrode tip dressing apparatus;

FIG. 25 is a front elevational view of the electrode tip dressing apparatus;

FIG. 26 is a sectional view taken along the line XXVI—XXVI of FIG. 25;

FIG. 27 is a perspective view of the lower case according to another mode;

FIGS. 29 and 30 relate to a seventh embodiment of the present invention, wherein:

FIG. 29 is a schematic view of the electrode tip dressing apparatus; and

FIG. 30 is a schematic view of the electrode tip dressing apparatus according to a different mode.

DETAILED DESCRIPTION OF THE PREFERRED EMBODIMENTS

Figure 1:
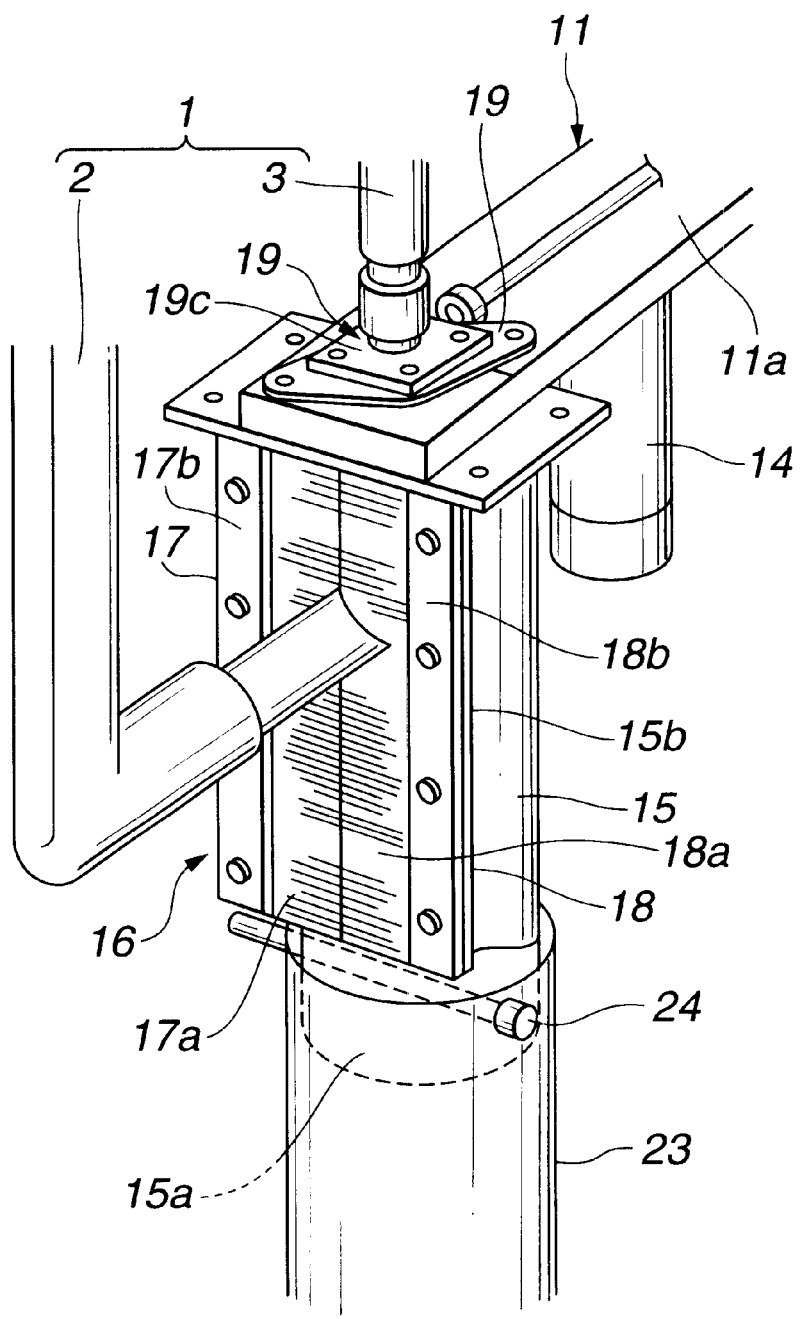

FIGS. 1 to 7 show a first embodiment of the present invention.

In the figure, reference numeral 1 denotes a welding gun mounted on a welding robot. The welding gun 1 includes first and second gun arms 2 and 3, and electrode tips 4 and 5 are detachably mounted at both ends of the gun arms 2 and 3 in confrontation with each other. Both the electrode tips 4 and 5 are disposed coaxially and are relatively approached to or separated from each other by the forward or backward movement of at least one of both the gun arms 2 and 3.

Reference numeral 11 denotes a tip dresser for dressing the ends of the electrode tips 4 and 5. The tip dresser 11 is disposed at the position where the tip dresser 11 does not interfere with a welding work within the working range of the welding robot.

A holder 12 is disposed at the end of a main body 11a extending to a side of the tip dresser 11, and a dressing body 13 is rotatably supported by the holder 12. The dressing body 13 is rotated by a servo motor 14 that is suspended from the main body 11a. Cutters 13a and 13b each formed in a concave shape are disposed on the upper and lower surfaces of the dressing body 13 so as to dress the ends of the electrode tips 4 and 5 to a predetermined shape by polishing or grinding.

Further, a lower chip capturing case 15 is mounted on the lower surface of the main body 11a. The lower chip capturing case 15 is fixedly disposed to surround the holder 12 that opens to the lower surface of the main body 11a as well as has a chip ejection port 15a formed through the bottom thereof. Further, a tip inserting port 15b is formed on one side of the lower chip capturing case 15.

A shield member 16 is disposed to the tip inserting port 15b. The shield member 16 is composed of a pair of brush units 17 and 18 that are disposed on right and left sides of the tip inserting port 15b in confrontation with each other. Brushes 17a and 18a made from nylon are disposed to the respective brush units 17 and 18 respectively, and the roots of the brushes 17a and 18a are clamped and fixed to the edges of the tip inserting port 15b by plates 17b and 18b.

Note that air tightness is not required to the shield member 16 because it is used to prevent the chips generated when the electrode tips 4 and 5 are dressed from scattering to the outside from the tip insertion port 15b.

Figure 2:
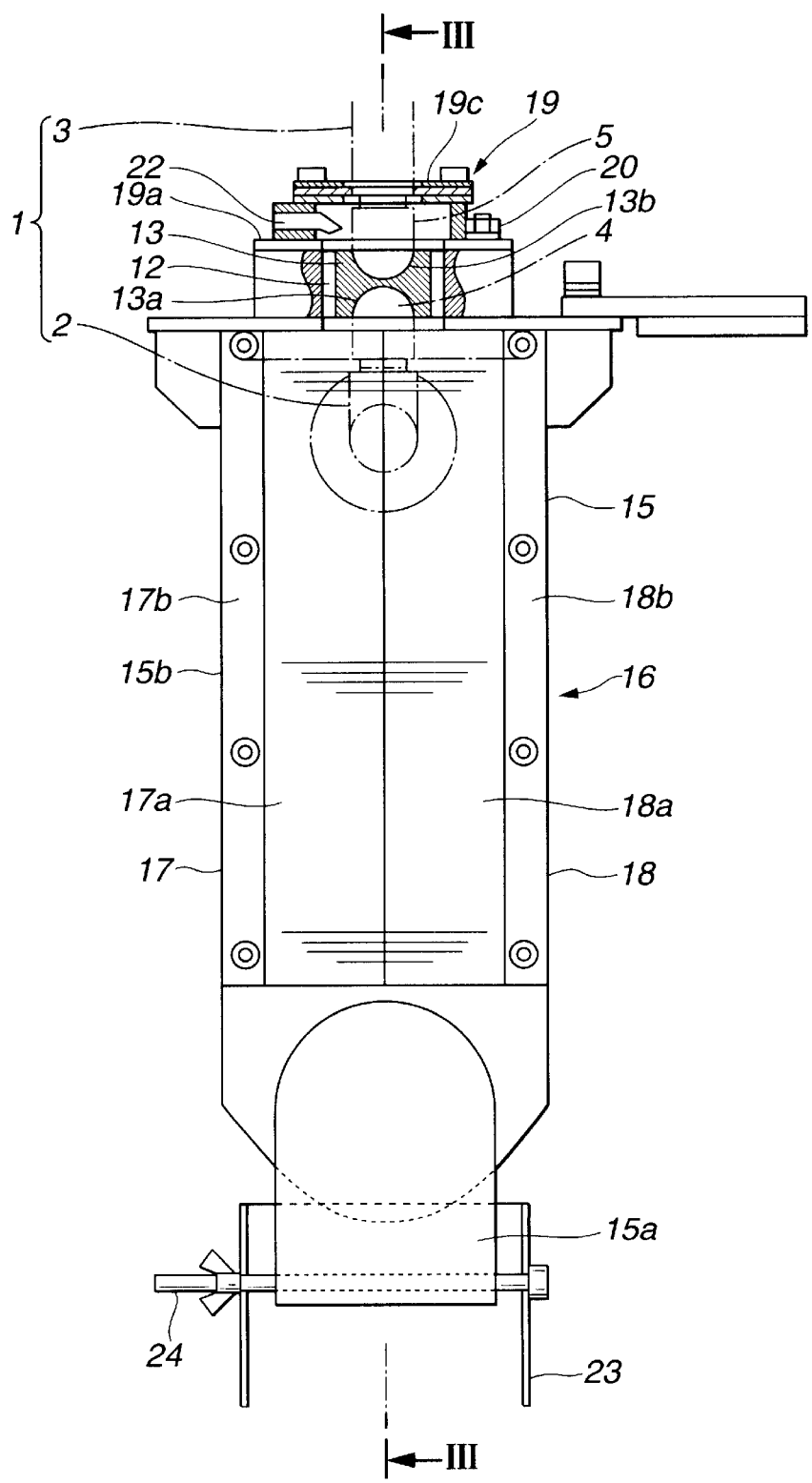
Figure 3:
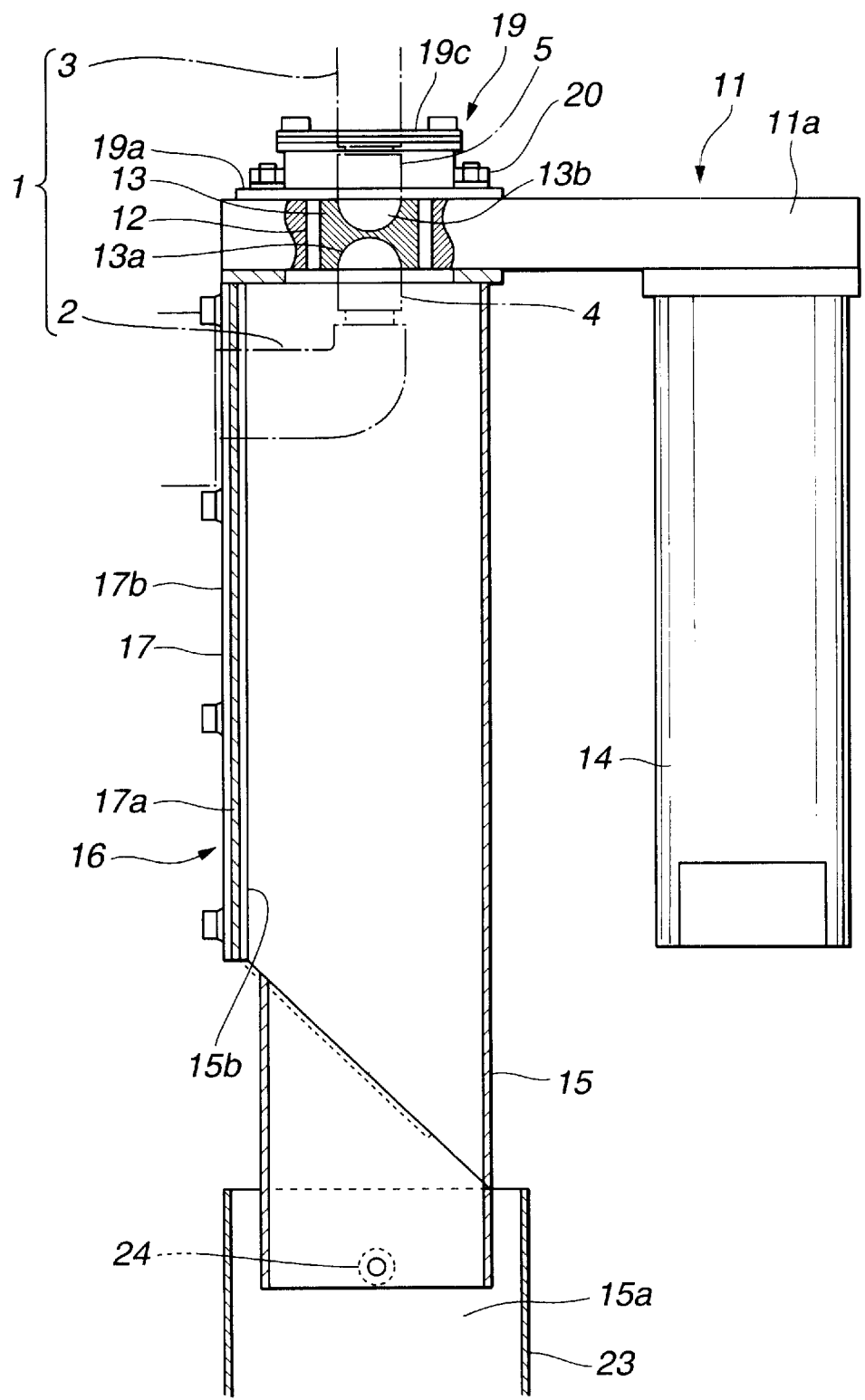

As shown in FIGS. 1 and 2, the ends of the brushes 17a and 18a of the brush units 17 and 18 are abutted against each other approximately at a center of the tip inserting port 15b so as to shield thereof. Further, an upper chip capturing case 19 is mounted on the upper surface of the main body 11a.

Figure 4:
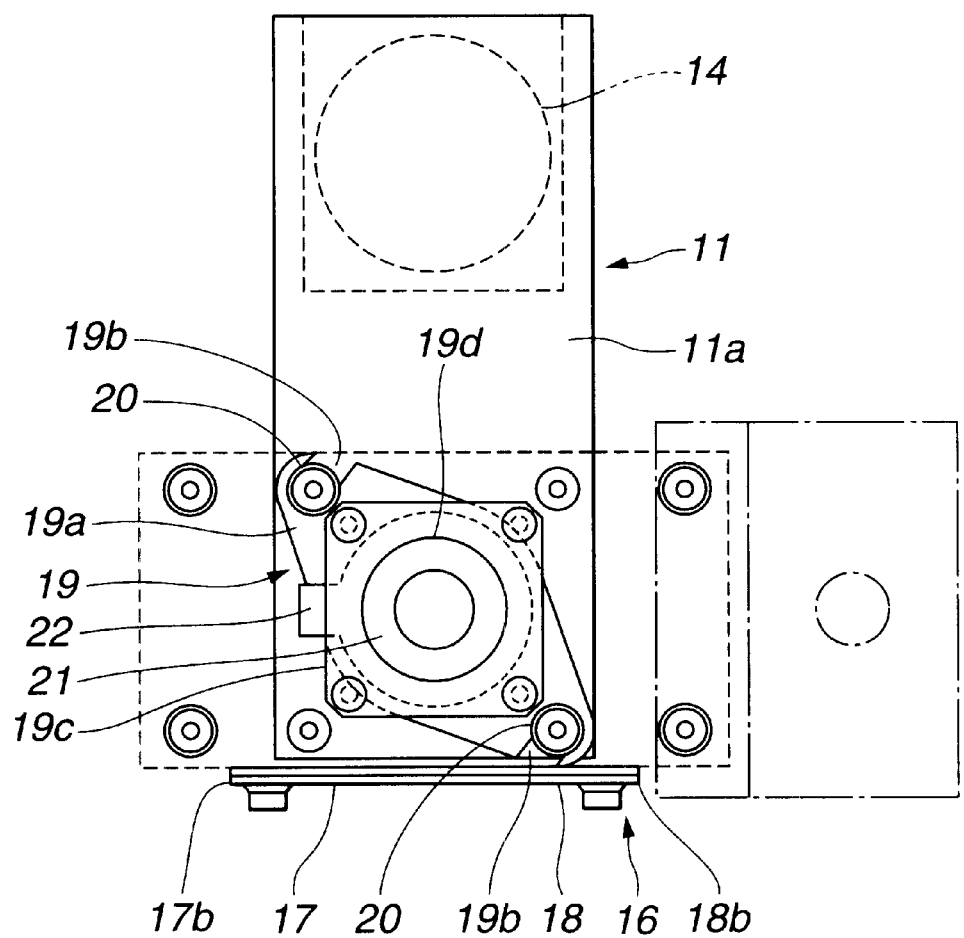

The upper chip capturing case 19 is disposed for surrounding the holder 12 that opens to the upper surface of the main body 11a. As shown in FIG. 4, a diamond-shaped base plate 19a is formed on the bottom of the upper chip capturing case 19, and clamp holes 19b drilled at the edges in a diagonal direction thereof are fixed on the upper surface of the main body 11a by such hooks 20 as bolts. As shown in the figure, both the clamp holes 19b have cutouts formed thereto so that they can be separated from the hooks 20 by turning the base plate 19a to a counterclockwise direction as shown in the figure.

The upper surface of the upper chip capturing case 19 is closed with a transparent plate 19c composed of resin. A tip inserting hole 19d is opened at the center of the transparent plate 19c, and a shield member 21 is disposed in the tip insert hole 19d. The shield member 21 is in sliding contact with the outside periphery of the gun arm 3 inserted into the tip inserting hole 19d to close a clearance therebetween and composed of a brush, a rubber plate having flexibility.

Note that the shield member 21 is not required to have air tightness because it is sufficient for the shield member 21 to prevent chips generated when the electrode tip 5 is dressed from scattering to the outside from the tip insert hole 19d.

Further, an air nozzle 22 for blowing air to the dressing body 13 is faced to the interior of the transparent plate 19c to prevent the dressing body 13 (refer to FIG. 2) from clogging.

In contrast, the upper end of a chip collection vessel 23 is suspended to the chip ejection port 15a formed through the bottom of the lower chip capturing case 15 by a suspension bolt 24. It is preferable that the chip collection vessel 23 be light in weight. For example, the lower portion of a PET bottle (bottle composed of polyethylene terephthalate) the upper portion of which is cut off may be used as the chip collection vessel 23.

Next, processes for dressing the electrode tips 4 and 5 by using an electrode tip dressing apparatus arranged as described above will sequentially be described.

Figure 5:
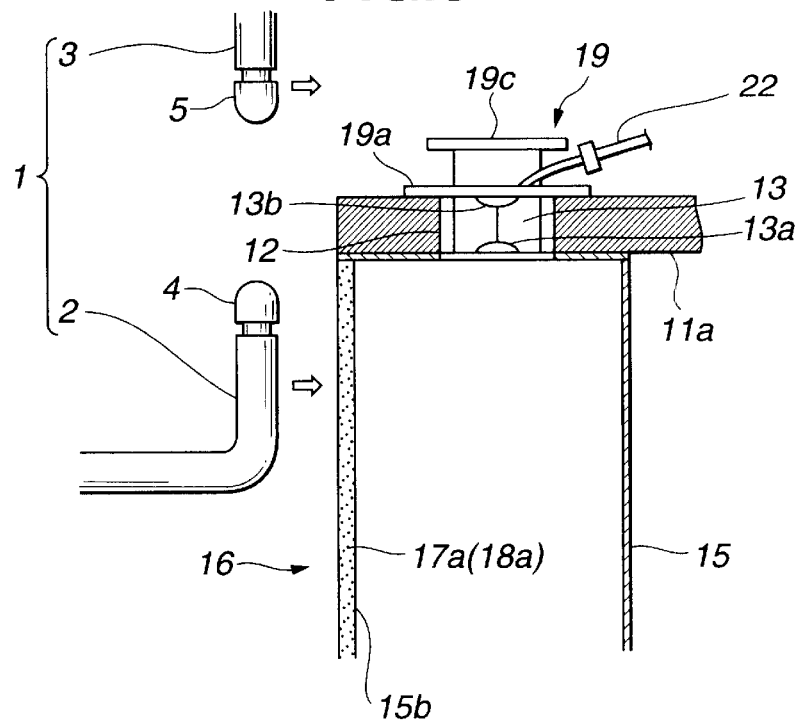

When the ends of the electrode tips 4 and 5 are to be dressed after the completion of a spot welding work by the welding robot, the first and second gun arms 2 and 3 disposed to the welding gun 1 are moved in a direction of the main body 11a by the welding robot (refer to FIG. 5).

Next, the first gun arm 2 is inserted into the lower chip capturing case 15 mounted on the lower surface of the main body 11a through the tip inserting port 15b thereof and faced to the interior of the lower chip capturing case 15. The tip inserting port 15b is shielded with the brushes 17a and 18a extending from the left and right sides thereof. When the first gun arm 2 is inserted through the tip inserting port 15b, the brushes 17a and 18a are flexed (tortured) along the outside shape of the first gun arm 2 and close the periphery thereof.

Figure 6:
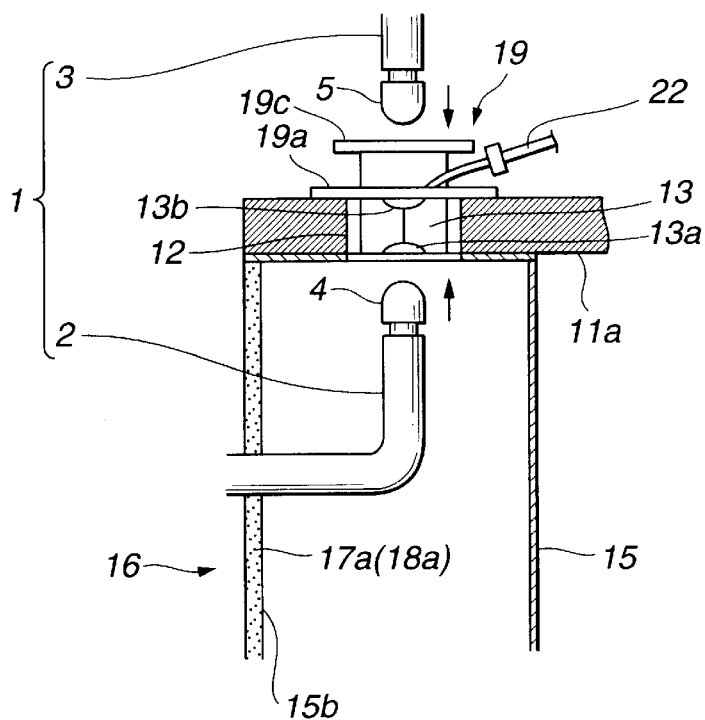
Figure 7:
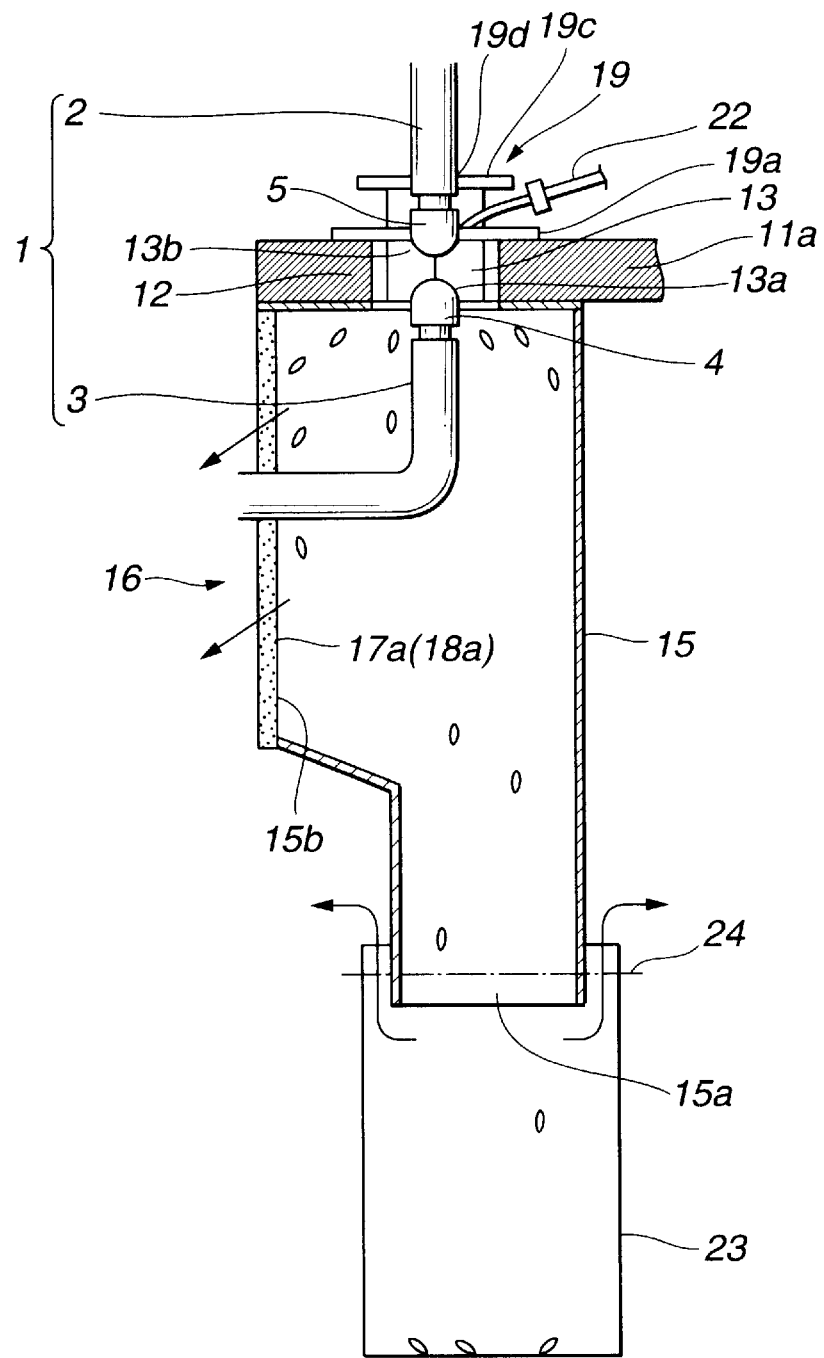

Then, the axial center of the electrode tip 4 disposed at the end of the first gun arm 2 is aligned with the central axis of the dressing body 13 disposed to the holder 12 that is provided with the main body 11a (refer to FIG. 6). At this time, since the electrode tip 4 is disposed coaxially with the electrode tip 5 that is disposed at the end of the second gun arm 3, the axial center of the electrode tip 5 also is aligned with the central axis of the dressing body 13.

Thereafter, both the gun arms 2 and 3 are moved to cause both the electrode tips 4 and 5 to relatively approach to each other. Thus, first, the electrode tip 5 disposed at the end of the second gun arm 3 is faced to the tip inserting hole 19*d* opened to the transparent plate 19*c* of the upper chip capturing case 19 that is fixedly disposed on the upper surface of the main body 11*a*.

The flexible shield member 21 that is formed in a ring shape is disposed to the tip inserting hole 19*d* and closes the outside periphery of the second gun arm 3.

Then, when the electrode tips 4 and 5 further approach to each other, these are abutted against the cutters 13*a* and 13*b* that are disposed on the lower and upper surfaces of the dressing body 13, respectively, and the dressing body 13 is clamped under pressure therebetween.

The dressing body 13 is rotated by the servo motor 14 disposed to the dresser main body 11*a*, and air is blown toward the dressing body 13 from the air nozzle 22 facing the interior of the upper chip capturing case 19. The air blown from the air nozzle 22 flows from the upper chip capturing case 19 to the lower chip capturing case 15 and is blown out to the outside from the tip inserting port 15*b* and the chip ejection port 15*a* of the lower chip capturing case 15 as shown by arrows in FIG. 7.

Note that the drive of the dressing body 13 and the blowing air from the air nozzle 22 may be started in synchronism with the detection of a state that the electrode tips 4 and 5 have approached or have been abutted against the dressing body 13.

Then, the chips are generated when the electrode tips 4 and 5 are polished or ground with the cutters 13*a* and 13*b* disposed to the dressing body 13. These chips are introduced to the lower chip capturing case 15 by the air blown from the air nozzle 22 faced to the upper chip capturing case 19. At this time, the chips, which are introduced by the air which leaks from the tip insertion port 15*b*, collide with the brushes 17*a* and 18*a* disposed to the tip inserting port 15*b* and are dropped into the lower chip capturing case 15.

Thereafter, the chips having been dropped into the lower chip capturing case 15 are accumulated in the chip collection vessel 23 suspended to the chip ejection port 15*a* formed through the bottom of the lower chip capturing case 15.

In contrast, when the electrode tips 4 and 5 have been dressed, the first and second gun arms 2 and 3 are separated from the main body 11*a* through a movement opposite to that when they were inserted and caused to wait for the next spot welding.

When the chips accumulated in the chip collection vessel 23 reach a predetermined amount, they are collected and reused. Otherwise, these are collected and reused periodically.

As described above, according to this embodiment, since the lower and upper surfaces of the dressing body 13 are surrounded with the lower and upper chip capturing cases 15 and 19 and the electrode tips 4 and 5 are dressed in both the cases 15 and 19, the chips generated in the dressing operation movement are not dispersed to the outside and can be effectively collected in the chip collection vessel 23 and reused, whereby a chip reuse ratio can be improved.

In this case, since the air is utilized to prevent the dressing body 13 from clogging and the chips are positively introduced in a direction of the chip ejection port 15*a* formed through the bottom of the lower chip capturing case 15, the chip collection efficiency of collecting chips can be more improved. Further, since an existing air blow device can be utilized as it is as the air blow device, cost of equipment can be suppressed.

In addition, since the tip insertion ports 15*b* and 19*d*, into which the first and second gun arms 2 and 3 are inserted, are shielded with the shield members 16 and 21, no chip is scattered, whereby the chips can be collected very effectively.

Figure 8:
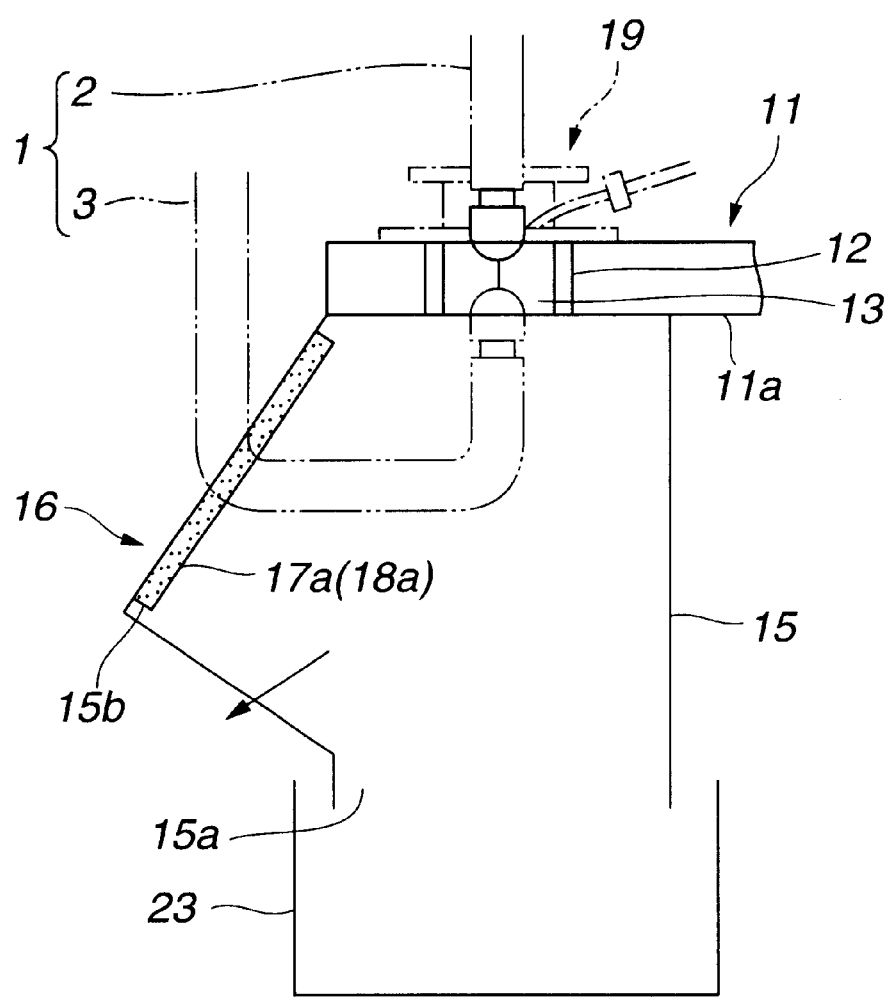
FIG. 8 is a view explaining a state when the electrode tips are dressed by a second embodiment of the present invention.

FIG. 8 shows a second embodiment of the present invention.

In this embodiment, the tip inserting port 15*b* disposed to the lower chip capturing case 15 is opened obliquely upward.

With the tip inserting port 15*b* directed obliquely upward, the chips dropping downward are unlike to leak to the outside through the brushes 17*a* and 18*a* disposed to the tip inserting port 15*b*, whereby the chip collection efficiency of the chips collected by the chip collection vessel 23 can be more improved.

FIGS. 9 to 17 show a third embodiment of the present invention.

In the aforementioned first embodiment, the dressing body 13 exposed to the upper and lower surfaces of the main body 11*a* is separately covered with the upper and lower chip capturing cases 19 and 15. In this second embodiment, however, the end of the main body 11*a* is inserted into a single chip capturing case 25, and the interior of the chip capturing case 25 is partitioned into an upper chamber 25*e* and a lower chamber 25*f* by the main body 11*a*.

The chip capturing case 25 is mounted at the end of the main body 11*a* extending to a side of the tip dresser 11. The chip capturing case 25 is formed by processing a thin steel sheet, and the upper surface thereof inclines obliquely upward in a backward direction. A tip inserting port 25*a* having a predetermined width is opened from the front surface to the upper surface of the chip capturing case 25.

Further, a hole 25*b* is opened through the back surface of the chip capturing case 25 at a upper portion thereof so that the end of the main body 11*a* is inserted therethrough, whereas the bottom 25*c* of the chip capturing case 25 is formed as an inclined surface that inclines from the front surface to the back surface of the case 25. A chip ejection port 25*d* is formed to the inclined surface of the bottom 25*c* on a lower side thereof.

The upper end of the chip collection vessel 23 is suspended to the chip ejection port 25*d* through the suspension bolt 24. A pet bottle or the like subjected to predetermined processing may be diverted as the chip collection vessel 23 similarly to the first embodiment.

In contrast, a shield member 29 is fixedly disposed to the tip inserting port 25*a* of the chip capturing case 25. The shield member 29 is composed of a pair of brush units 30 and 31 disposed on the right and left sides of the tip inserting port 25*a* in confrontation with each other. Brushes 30*a* and 31*a* composed (made from) nylon are disposed to the respective brush units 30 and 31, and the roots of the brushes 30*a* and 31*a* are clamped and fixed to the edges of the tip inserting port 25*b* by plates 30*b* and 31*b*.

The tip insertion port 25*a* is entirely covered with the brush units 30 and 31 over the front surface and the upper surface thereof, whereby the chips generated when the electrode tips 4 and 5 are dressed can be prevented from dispersing to the outside from the tip inserting port 25*a*.

Figure 9:
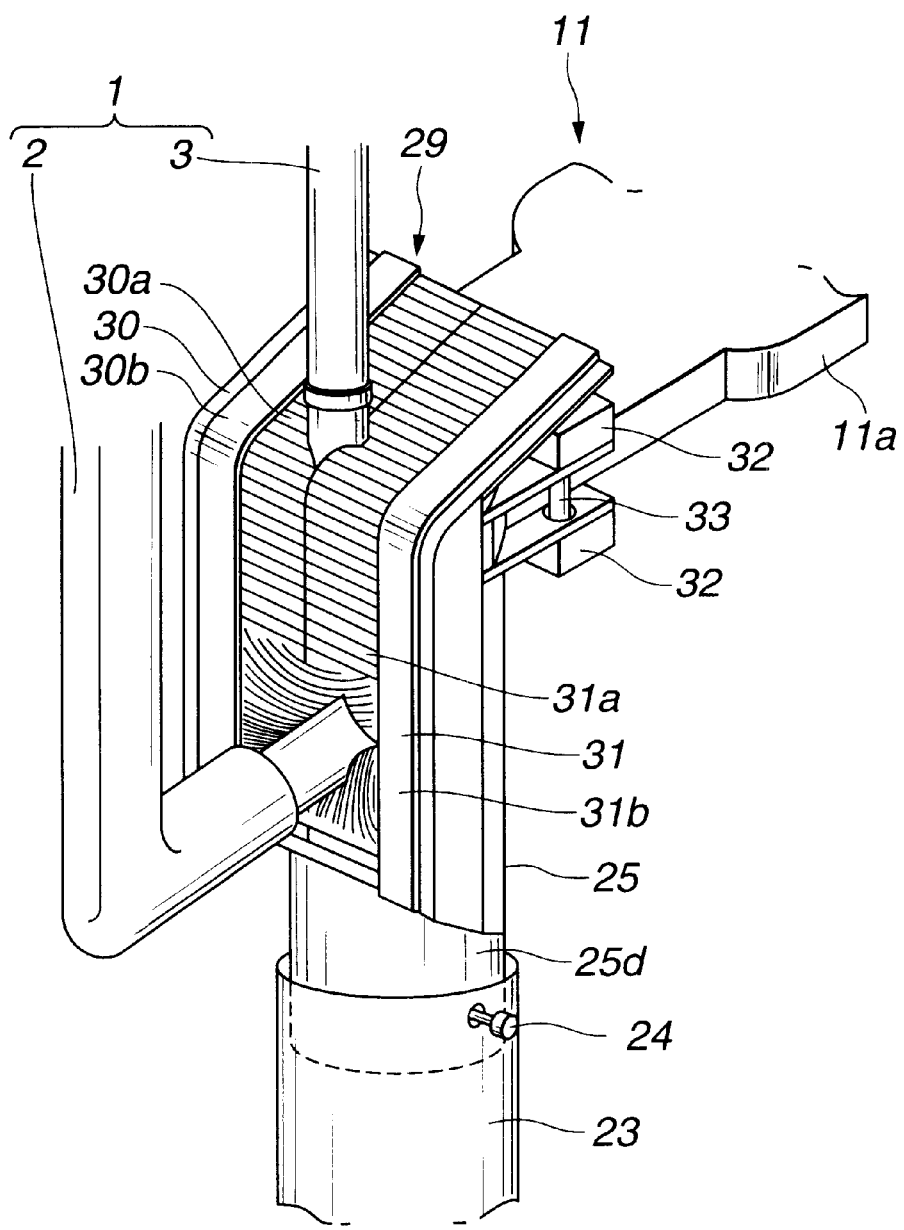
Figure 10:
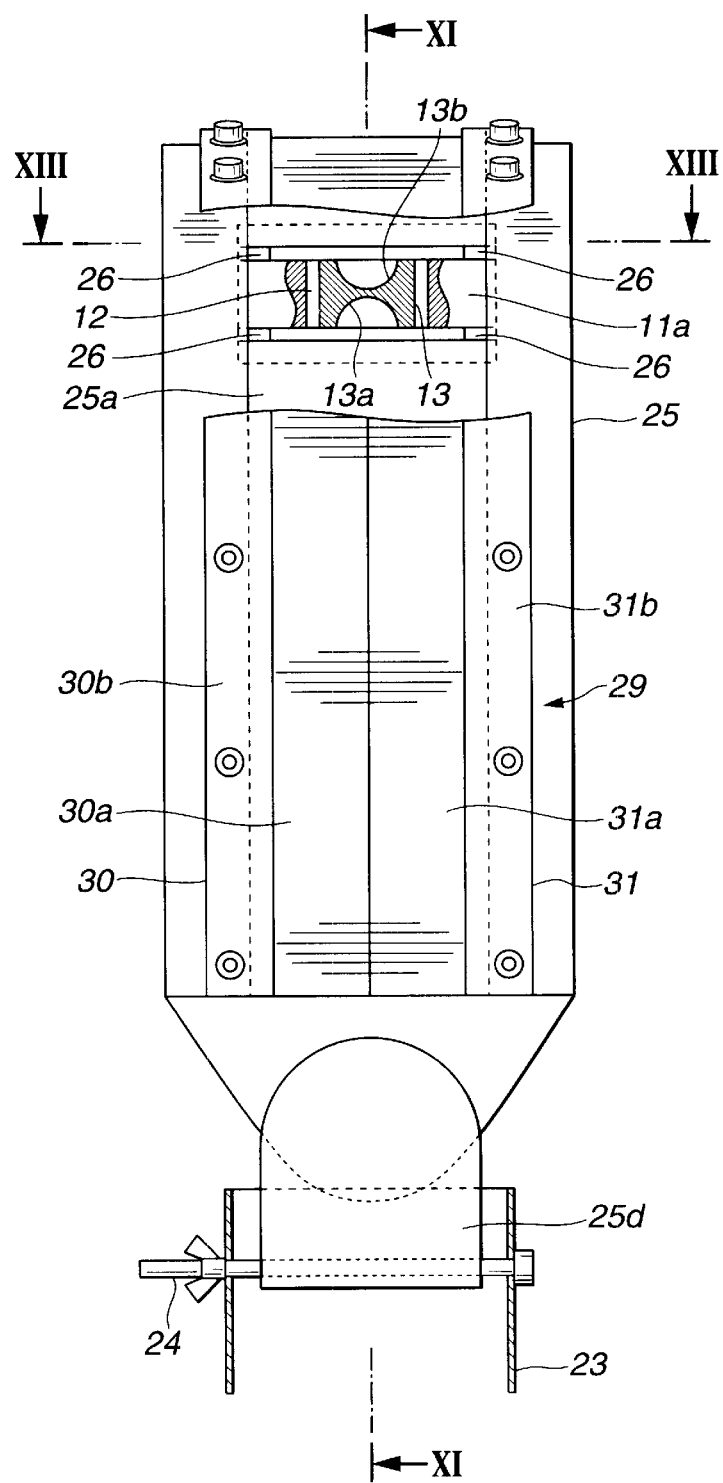
Figure 11:
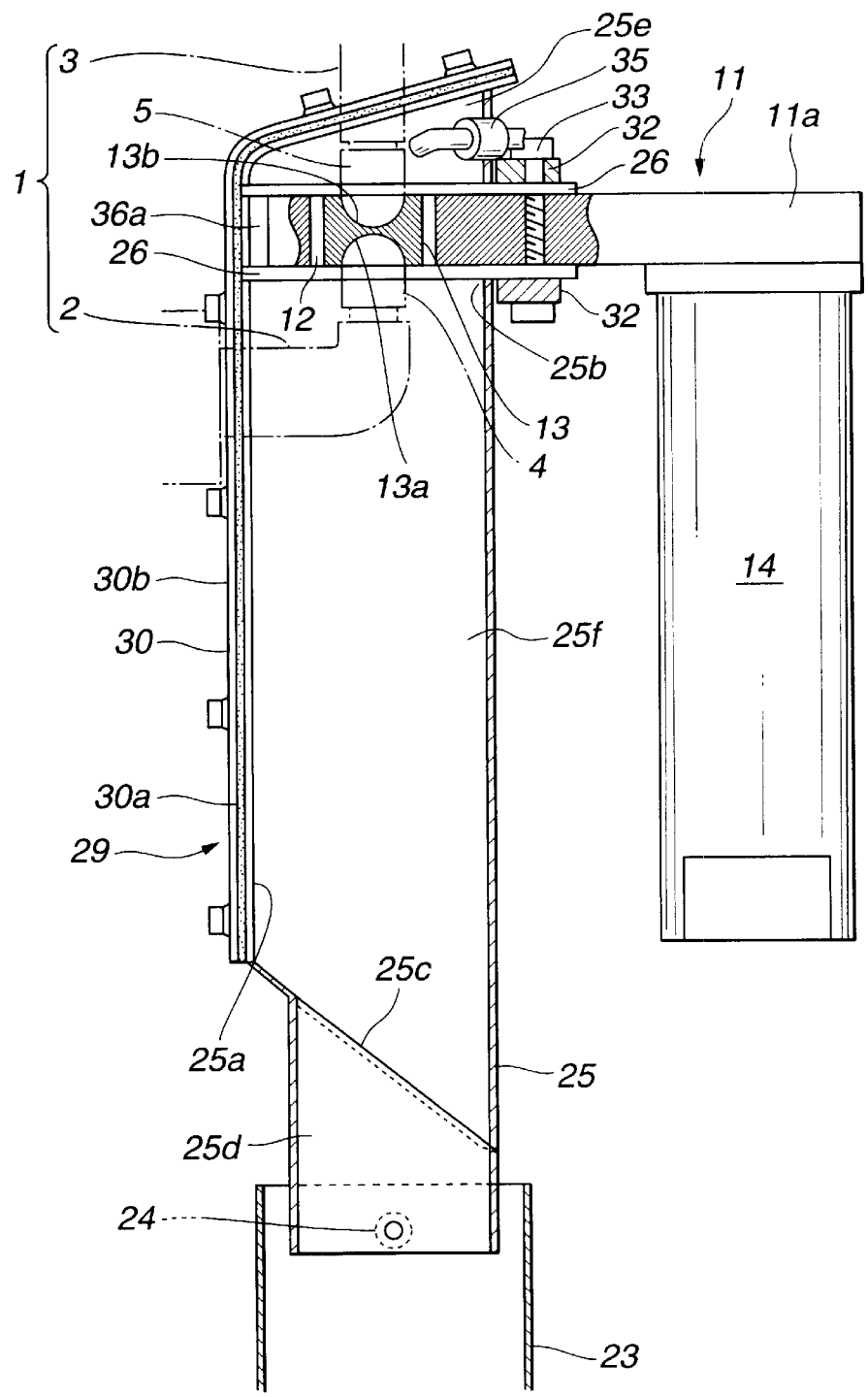
Figure 12:
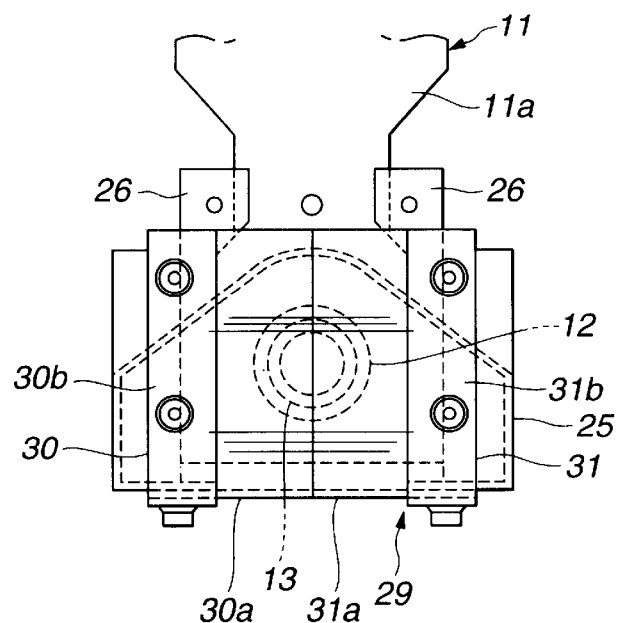
Figure 13:
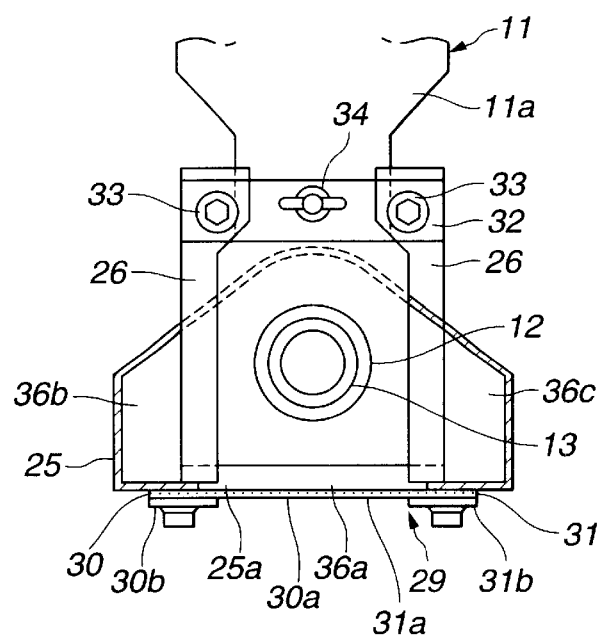
Figure 14:
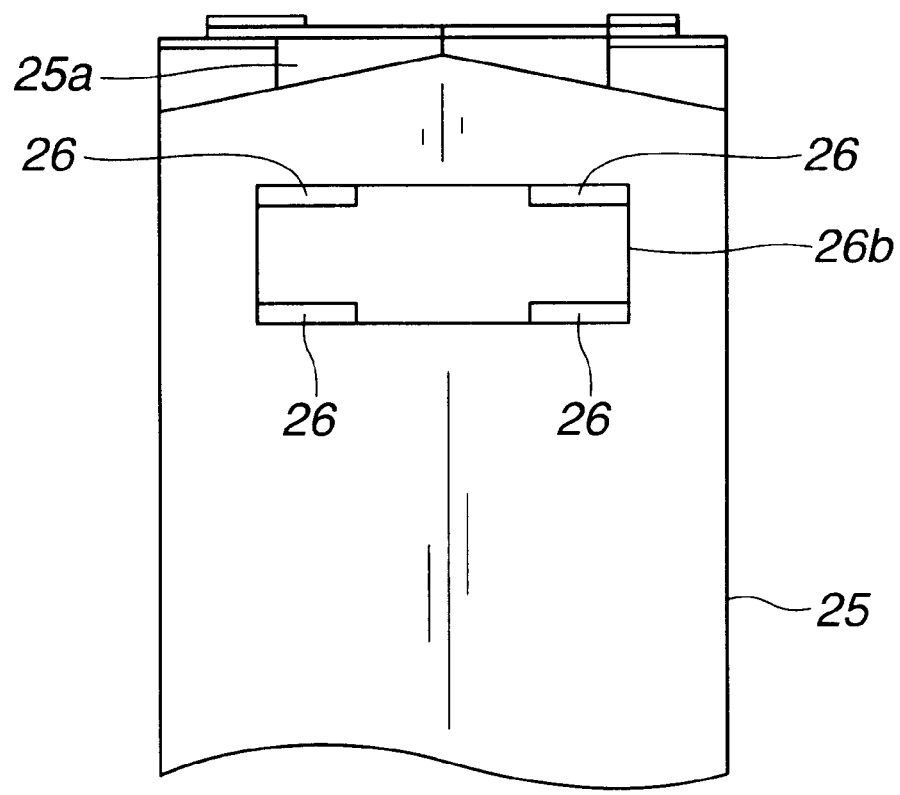

As shown in FIGS. 9, 10, and 13, the ends of the brushes 30*a* and 31*a* of the respective brush units 30 and 31 are abutted against the tip inserting port 25a approximately at the center in the width direction thereof.

Further, support plates 26 are disposed to the hole 25b opened through the back surface of the chip capturing case 25 at the four corners on the upper and lower sides thereof. The front ends of the respective support plates 26 horizontally extend in a direction of the tip inserting port 25a, the extreme ends of the respective support plates 26 are welded to the edges of the tip inserting port 25a on the inner surface side thereof, and further the portions of the support plates 26 in contact with the hole 25b are welded thereto.

When the end of the main body 11a is inserted into the hole 25b, the main body 11a is positioned with the upper and lower edges thereof supported by the support plates 26, the interior of the chip capturing case 25 is partitioned into the upper chamber 25e and the lower chamber 25f, and the upper and lower surfaces of the dressing body 13 supported by the holder 12 disposed at the end of the main body 11a are exposed to the upper and lower chambers 25e and 25f, respectively.

The rear portions of the support plates 26 project to the outside from the hole 25b, and a pair of fixing blocks 32 are abutted against the projecting portions from the upper and lower sides thereof. Both ends of the fixing blocks 32 are tightened by bolts 33 so that they are clamped and fixed to the main body 11a. Further, the fixing blocks 32 are positioned to the main body 11a by screws 34 (refer to FIG. 13) passing through the fixing blocks 32 at the center thereof.

Note that cutouts are formed to the portions of the main body 11a through which the bolts 33 pass.

Further, an air nozzle 35 is fixed to the back surface of the upper chamber 25e of the chip capturing case 25, and the end of the air nozzle 35 is directed toward the dressing body 13 exposed to the upper chamber 25e. The chips deposited (adhered) on the dressing body 13 are blown off by the air blown from the air nozzle 35 so as to prevent the dressing body 13 from clogging.

As shown in FIG. 13, cavities 36a, 36b, and 36c are formed between the inner wall of the chip capturing case 25 and the end and both the sides of the main body 11a, and the upper chamber 25e communicates with the lower chamber 25f through the cavities 36a, 36b, and 36c and a clearance formed to the dressing body 13.

Next, the operation of an electrode tip dressing apparatus arranged as described above will be described.

Figure 15:
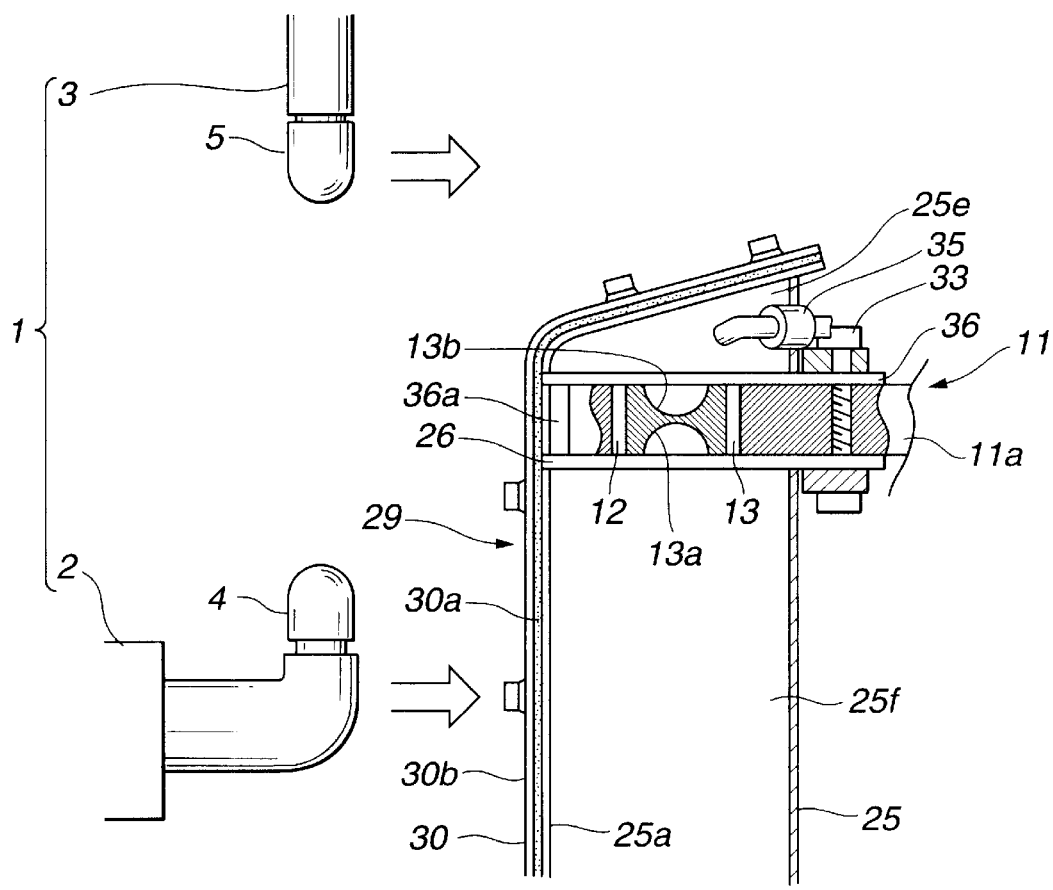

When the ends of the electrode tips 4 and 5 are to be dressed after the completion of a spot welding work using the welding robot, the first and second gun arms 2 and 3 disposed to the welding gun 1 are moved in a direction of the main body 11a by the welding robot in a state that the gun arm 2 is separated from the second gun arm 3 by a predetermined distance (refer to FIG. 15).

Note that the chip capturing case 25 is mounted on and fixed to the end of the main body 11a, and the front and upper surfaces of the chip capturing case 25, to which the gun arms 2 and 3 are faced, are shielded with the brushes 30a and 31a.

Then, both the gun arms 2 and 3 are approached to the front surface of the chip capturing case 25, the first gun arm 2 is caused to pass through the brushes 30a and 31a so as to face the lower chamber 25f of the chip capturing case 25 as well as the second gun arm 3 is disposed above the chip capturing case 25.

When the first gun arm 2 passes through the brushes 30a and 31a, they are elastically deformed along the outside shape of the first gun arm 2 and close the periphery thereof.

Figure 16:
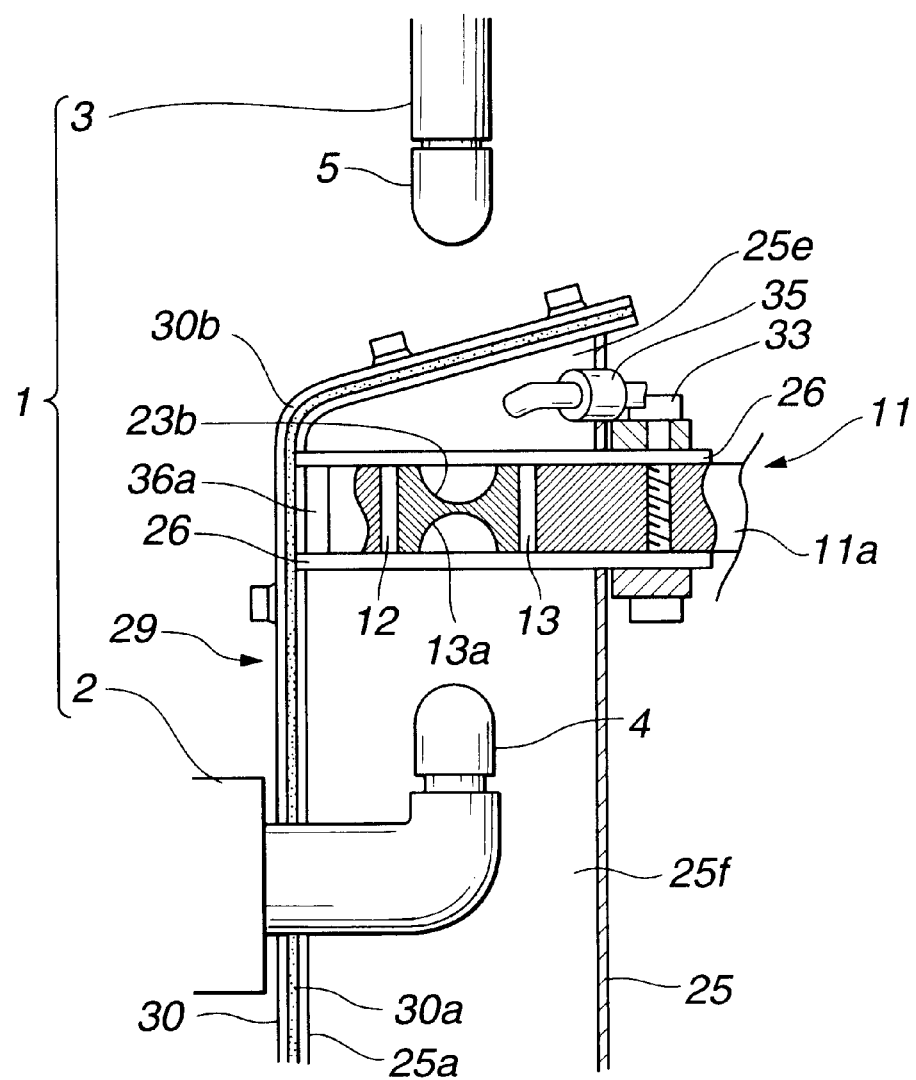
Figure 17:
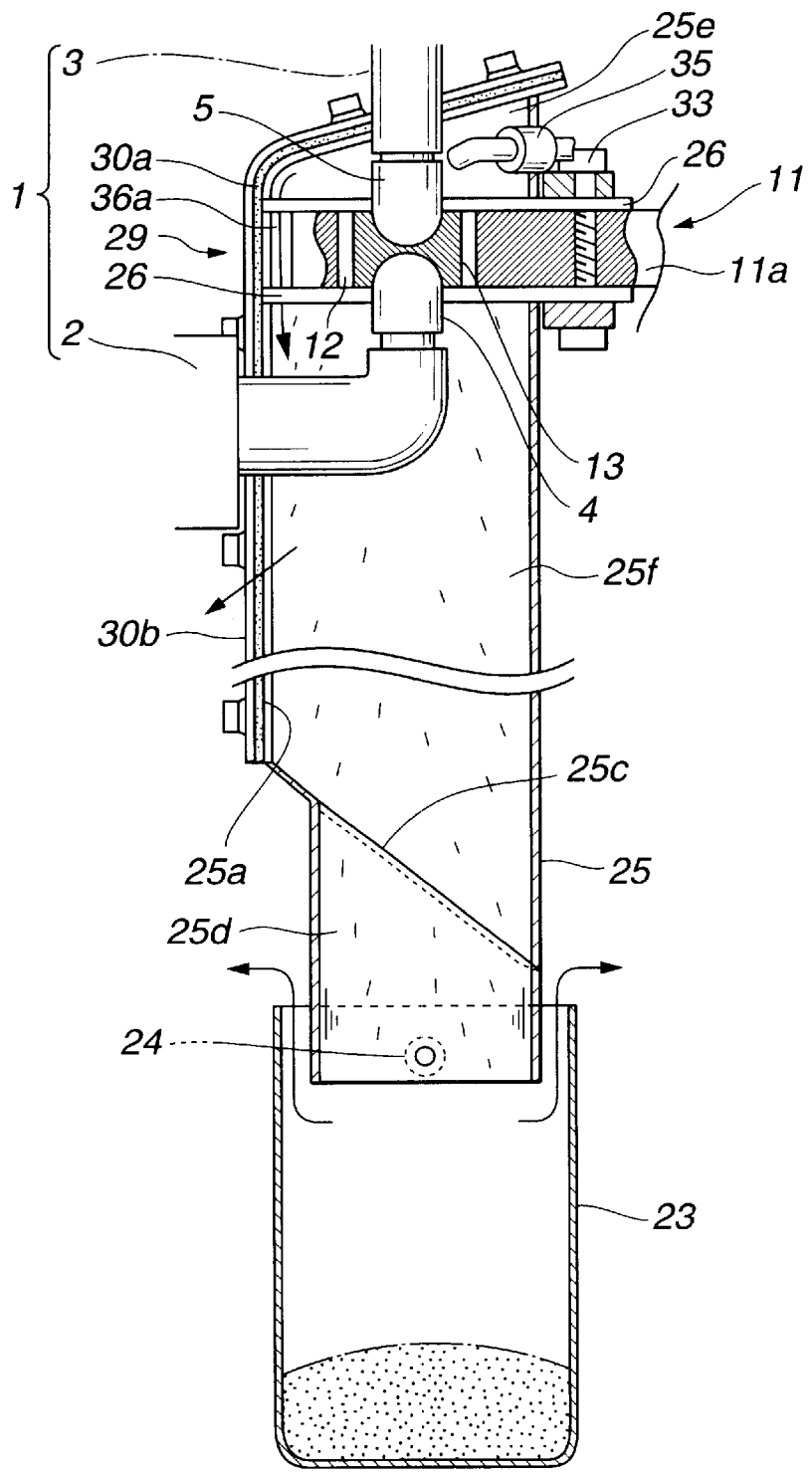
Figure 18:
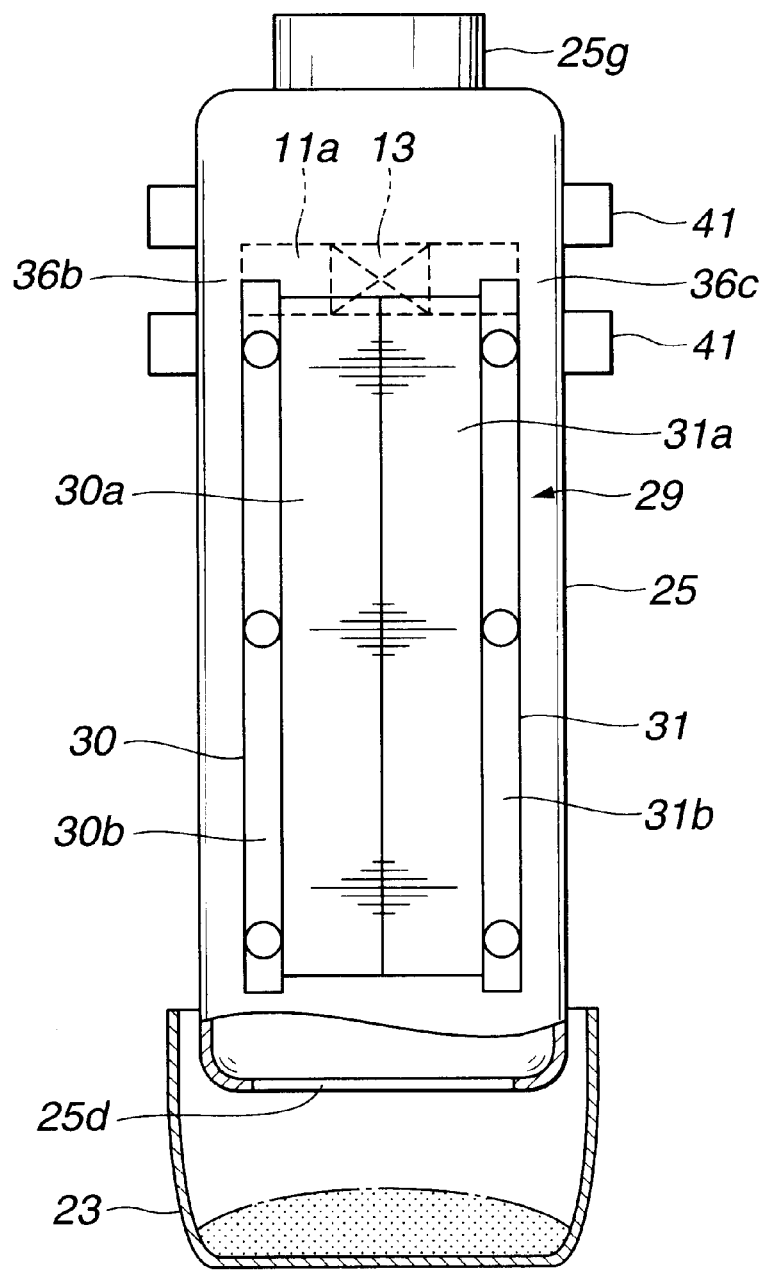
Figure 19:
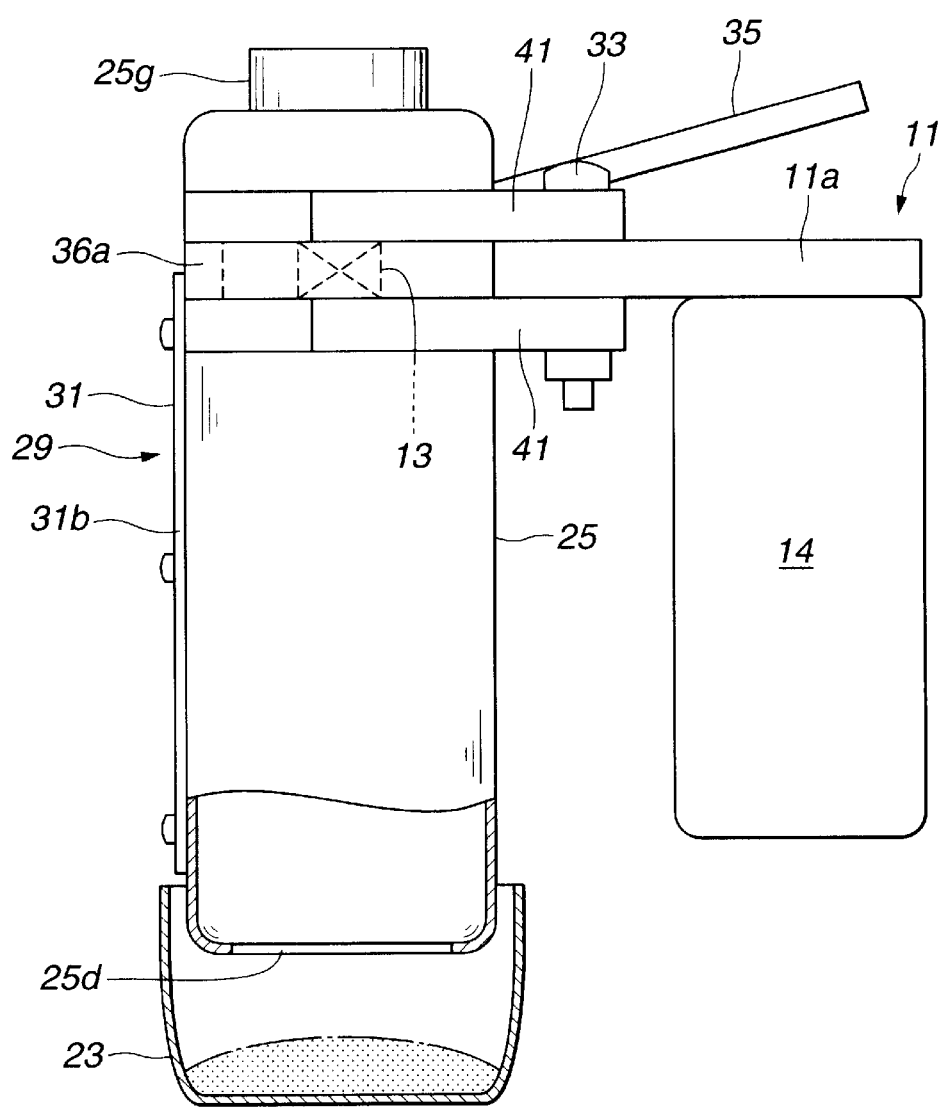

Next, the axial center of the electrode tip 4 disposed at the end of the first gun arm 2 is aligned with the central axis of the dressing body 13 disposed to the holder 12 that is provided with the main body 11a (refer to FIG. 16). At this time, since the electrode tip 4 is disposed coaxially with the electrode tip 5 that is disposed at the end of the second gun arm 3, the electrode tip 5 also is aligned with the central axis of the dressing body 13.

Thereafter, both the gun arms 2 and 3 are moved to cause both the electrode tips 4 and 5 to relatively approach to each other. Thus, the electrode tip 5 disposed at the end of the second gun arm 3 first passes through the brushes 30a and 31a from the upper surface of the main body 11a and is faced to the upper chamber 25e. When the second gun arm 3 passes through the brushes 30a and 31a, these are elastically deformed (distorted) along the outside shape of the second gun arm 3 and close the periphery thereof.

Next, when the electrode tips 4 and 5 are further approached to each other, these are abutted against the cutters 13a and 13b disposed to the lower and upper surfaces of the dressing body 13, respectively, and the dressing body 13 is clamped under pressure between both the electrode tips 4 and 5.

The dressing body 13 is rotated by the servo motor 14 disposed to the main body 11a, and air is blown to the dressing body 13 from the air nozzle 35 facing the upper chamber 25e.

The chips deposited on the dressing body 13 are blown off by the air. The air blown to the dressing body 13 flows to the lower chamber 25f through the clearance of the dressing body 13 and the cavities 36a, 36b, and 36c secured around the periphery of the main body 11a and is blown out to the outside from the brushes 30a and 31a closing the front surface of the lower chamber 25f and from the chip ejection port 25d opened through the bottom 25c of the lower chamber 25f.

Note that the drive of the dressing body 13 and the blow of the air from the air nozzle 35 may be started in synchronism with the detection of a state that the electrode tips 4 and 5 have approached or have been abutted against the dressing body 13.

Then, the chips, which are generated when the electrode tips 4 and 5 are dressed by polishing or grinding with the cutters 13a and 13b mounted on the dressing body 13, are introduced to the lower chamber 25f by the air blown from the air nozzle 35 facing the upper chamber 25e.

At this time, the chips introduced (transferred) by the air which leaks from the brushes 30a and 31a to the outside collide with the inner surfaces of the brushes 17a and 18a and are dropped onto the bottom 25c of the lower chamber 25f.

The chips, which have been dropped onto the bottom 25c of the lower chamber 25f, pass through the chip ejection port 25d and are accumulated in the chip collection vessel 23 suspended to the chip ejection port 25d.

When the electrode tips 4 and 5 have been dressed, the first and second gun arms 2 and 3 are separated by the welding robot from the main body 11a through an operation movement opposite to that when these were inserted and caused to wait for the next spot welding.

When the chips accumulated in the chip collection vessel 23 reach a predetermined amount, these are collected and reused. Otherwise, these are collected and reused periodically.

As described above, according to this embodiment, since the end of the main body 11a is surrounded with the chip capturing case 25 and the electrode tips 4 and 5 are dressed in the case 25, the chips generated in an dressing operation are not dispersed to the outside and can be effectively collected in the chip collection vessel 23, whereby the chip reuse ratio can be improved.

In this case, since the air is utilized to prevent the dressing body 13 from clogging and chips are positively introduced in a direction of the bottom 25c of the lower chamber 25f, the chip collection efficiency can be more improved. Further, since an existing air blow device can be utilized as it is as the air blow device, cost of the equipment can be suppressed (reduced).

Since the tip inserting ports 15b and 19d, into which the first and second gun arms 2 and 3 are inserted, are shielded with the brushes 30a and 31a, no chip is scattered, whereby the chips can be collected very effectively. Further, since the brushes 30a and 31a are continuously disposed from the front surface of the chip capturing case 25 to the upper surface thereof, when the gun arms 2 and 3 are faced to the chip capturing case 25, it is not necessary to correctly align them with the chip capturing case 25, which improves workability.

The air blown out from the air nozzle 35 is introduced from the upper chamber 25e to the lower chamber 25f through not only the clearance of the dressing body 13 but also through the cavities 36a, 36b, and 36c secured around the periphery of the main body 11a. Thus, the air can easily be supplied from the upper chamber 25e to the lower chamber 25f, which permits the chips scattered in the upper chamber 25e to be promptly introduced into the lower chamber 25f.

FIGS. 18 to 22 show a fourth embodiment of the present invention.

Figure 21:
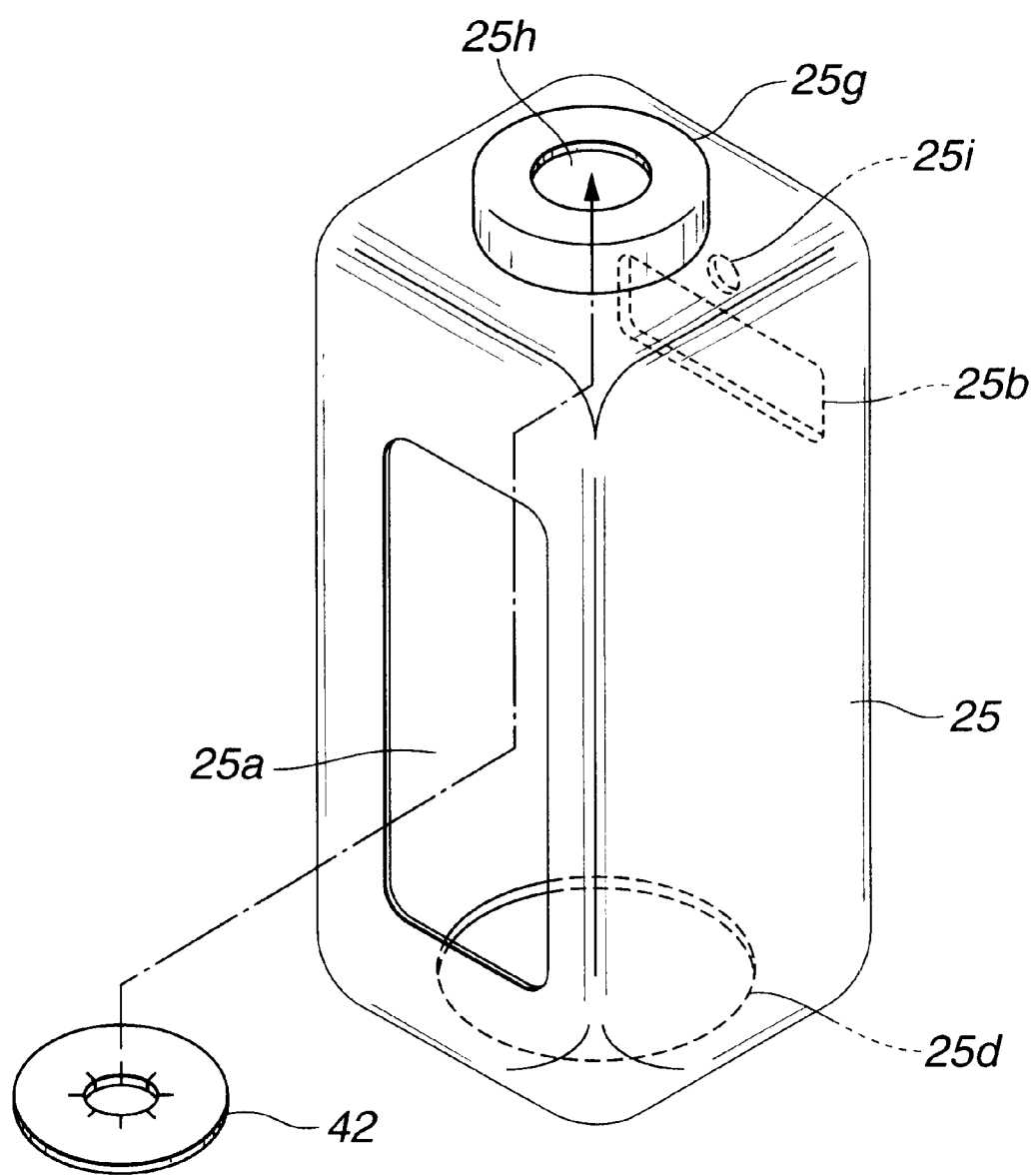

In this embodiment, the chip capturing case 25 is made by blow-molding. As shown in FIG. 21, the chip capturing case 25 is formed in a simple rectangular-prism-shape, and a projection 25g is formed integrally therewith when the case 25 is made by the blow-molding.

Then, a tip insertion port 25h is formed through the projection 25g; the tip insertion port 25a is formed through the front surface of the chip capturing case 25, the hole 25b, and a hole 25i through which an air nozzle 35 is mounted are formed through the back surface thereof; and further the chip ejection port 25d is formed through the bottom thereof in post processing, respectively.

Next, a ring-shaped, flexible and heat resistant shield member 42 is fixedly disposed to the tip insertion port 25h by such as adhesion bonding. The heat resistant shield member 42 slidably contacts with the outside periphery of the gun arm 3 that is inserted into the tip inserting hole 25h and closes the clearance between the outside periphery of the gun arm 3 and the tip insert hole 25h. The heat resistant shield member 42 is composed of silicon rubber, or the like.

Since the chip capturing case 25 is made by the blow-molding of resin materials, the weight thereof can be reduced and the structure thereof can be simplified as well as the economical efficiency and the mass-productivity thereof can be improved. At the same time, an electrode tip dressing apparatus can be more practically usably arranged by giving the highest priority to the breakage of the less expensive resin product in the occurrence of the collision of the apparatus due to control mistakes of the robot so that an adverse effect applied to the robot and the main body 11a can be minimized.

Further, when the chip capturing case 25 is fixedly disposed to the end of the main body 11a, first, holding blocks 41 are fixedly disposed to the upper and lower surfaces of the main body 11a.

Figure 20:
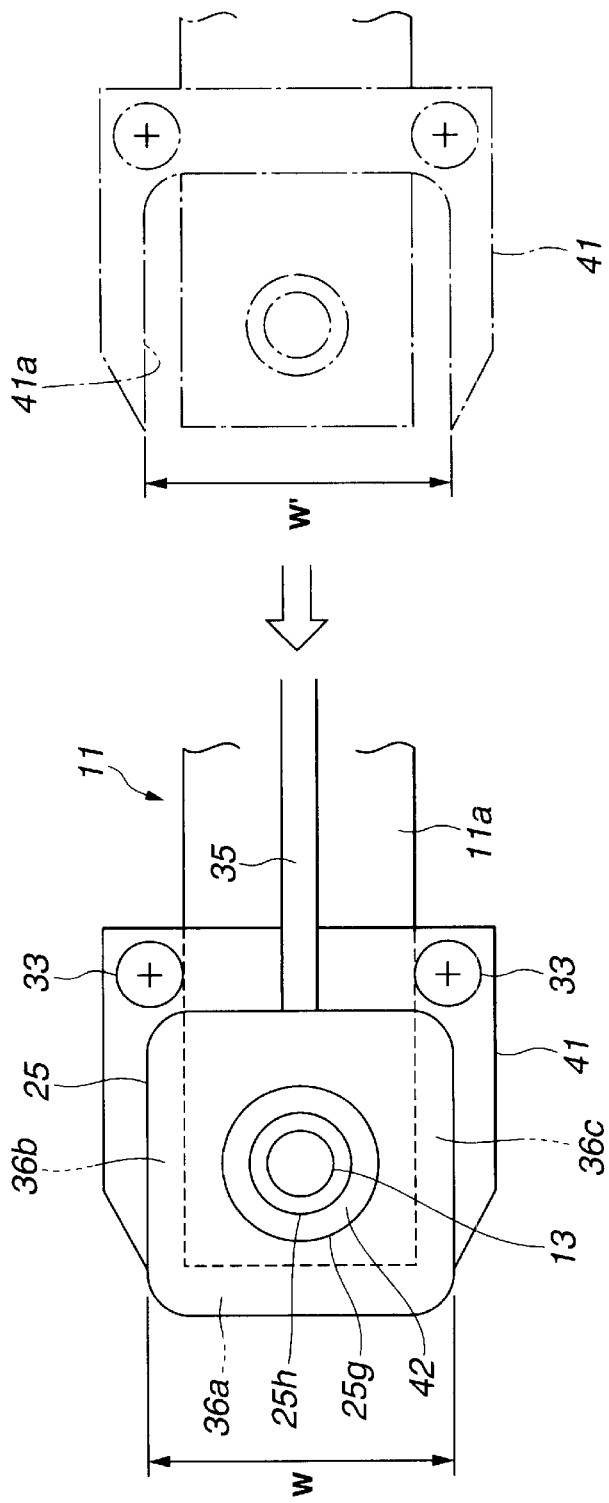

Next, as shown in FIG. 20, the end of the main body 11a is inserted into the hole 25b formed through the back surface of the chip capturing case 25. Thus, the recessed portions of fork-shaped members 41a formed at the ends of the holding blocks 41 are fitted on the outside surface of the chip capturing case 25.

Since the interval W' of each fork-shaped member 41a is formed slightly smaller than the width W between the sides of the chip capturing case 25, the chip capturing case 25 is held by the elastic deformation of the fork-shaped members 41a when fitted on the chip capturing case 25.

Then, when the fork-shaped members 41a are mounted on the chip capturing case 25 at predetermined positions and the chip capturing case 25 is fixedly disposed to the main body 11a, the cavities 36a, 36b, and 36c are formed around the end of the main body 11a in the chip capturing case 25.

Accordingly, the chips generated when dressing are introduced downward through the clearance of the dressing body 13 and the cavities 36a, 36b, and 36c secured around the main body 11a and accumulated in the chip collection vessel 23, similarly to the third embodiment.

With this arrangement, the reduction in weight of the chip capturing case 25 and the simplified structure thereof can be realized by the blow-molding. Further, since the tip inserting port 25h is shielded with the heat-resistant shield member 42, which is not easily deformed and broken by a friction heat generated when the electrode tip 5 is dressed, whereby the heat resistance of the chip capturing case 25 can be improved.

Figure 22:
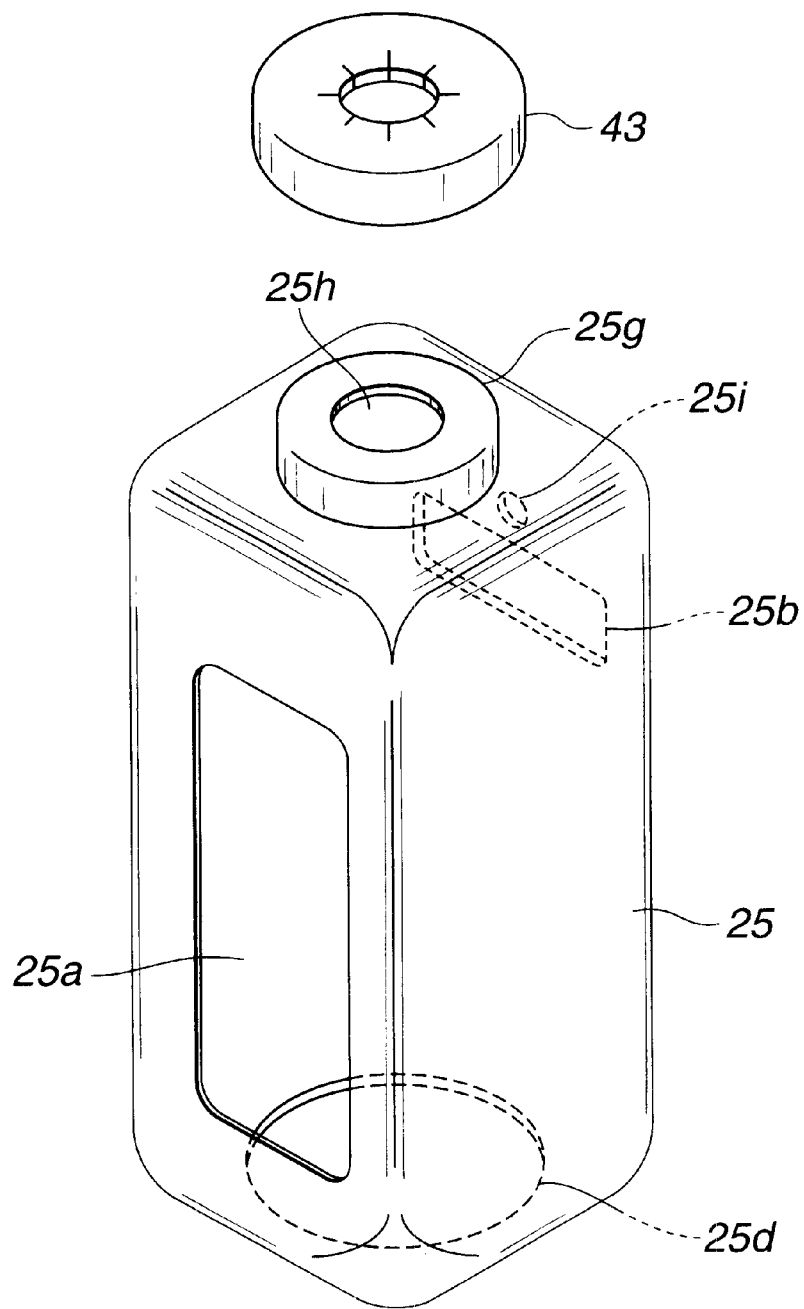

In this case, a heat resistant and flexible shield member 43 may be formed in a cap shape and fitted to the projection 25g from the outside as shown in FIG. 22. The formation of the shield member 43 in the cap shape permits it to be easily replaced. At this time, a hole formed at the center of the shield member 43 may be post processed according to the size of the electrode tip 5, and the versatility of the shield member 43 can be increased by the post processing.

FIGS. 23 to 27 show a fifth embodiment of the present invention.

In this embodiment, a lower chip capturing case 57 is turnably supported on the lower surface of the main body 11a.

That is, a support plate 55 is fixedly disposed to the lower surface of the main body 11a extending in a side direction of the tip dresser 11 at a portion thereof where the dresser 13 is exposed. A hole for escaping from the dressing body 13 is formed to the support plate 55 at a portion thereof corresponding to the dressing body 13, and further a boss 56 projects so as to surround the hole. A ring member 58, which is fixedly disposed on the upper surface of the lower chip capturing case 57, is fitted on the boss 56.

Screws 59 are threaded into the ring member 58 from four directions, and tightening the screws 59 to the boss 56 causes the ring member 58 to be fixed to the boss 56, and the lower chip capturing case 57 is suspended by the boss 56.

A hole having a diameter approximately the same as the inside diameter of the ring member 58 is formed to the upper surface of the lower chip capturing case 57 at a portion thereof corresponding to the ring member 58, and further a chip ejection port 57a is formed to the bottom of the lower chip capturing case 57. Further, a tip insertion port 57b is formed through the front surface of the lower chip capturing case 57.

A shield member 60 is disposed to the tip insertion port 57b. The shield member 60 is composed of a pair of brush units 61 and 62 that are disposed on the right and left sides of the tip inserting port 57b in confrontation with each other. Brushes 61a and 62a each composed nylon are disposed to the respective brush units 61 and 62, and the roots of the brushes 61a and 62a are clamped and fixed to the edges of the tip inserting port 57b by plates 61b and 62b.

Note that the shield member 60 is not required to have air tightness because it is used to prevent the chips generated when the electrode tips 4 and 5 are dressed from scattering to the outside from the tip insertion port 57b.

Figure 23:
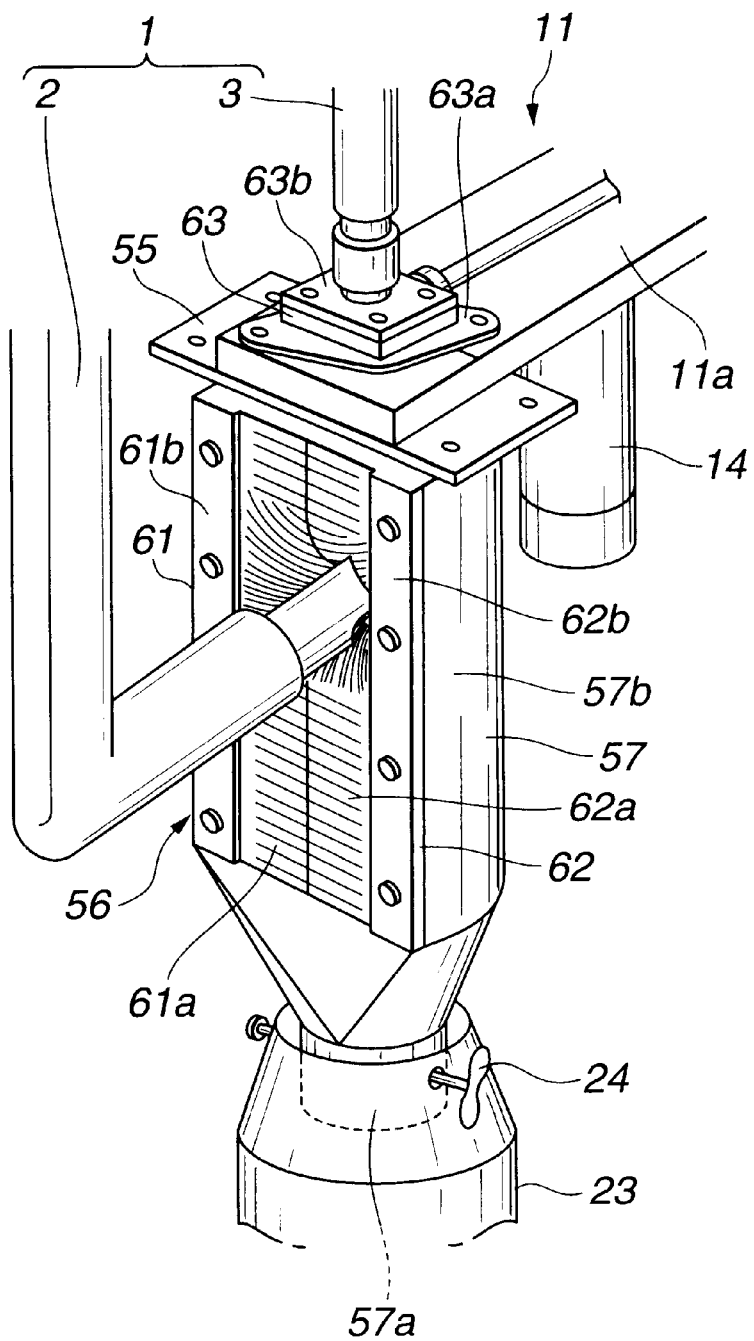
Figure 24:
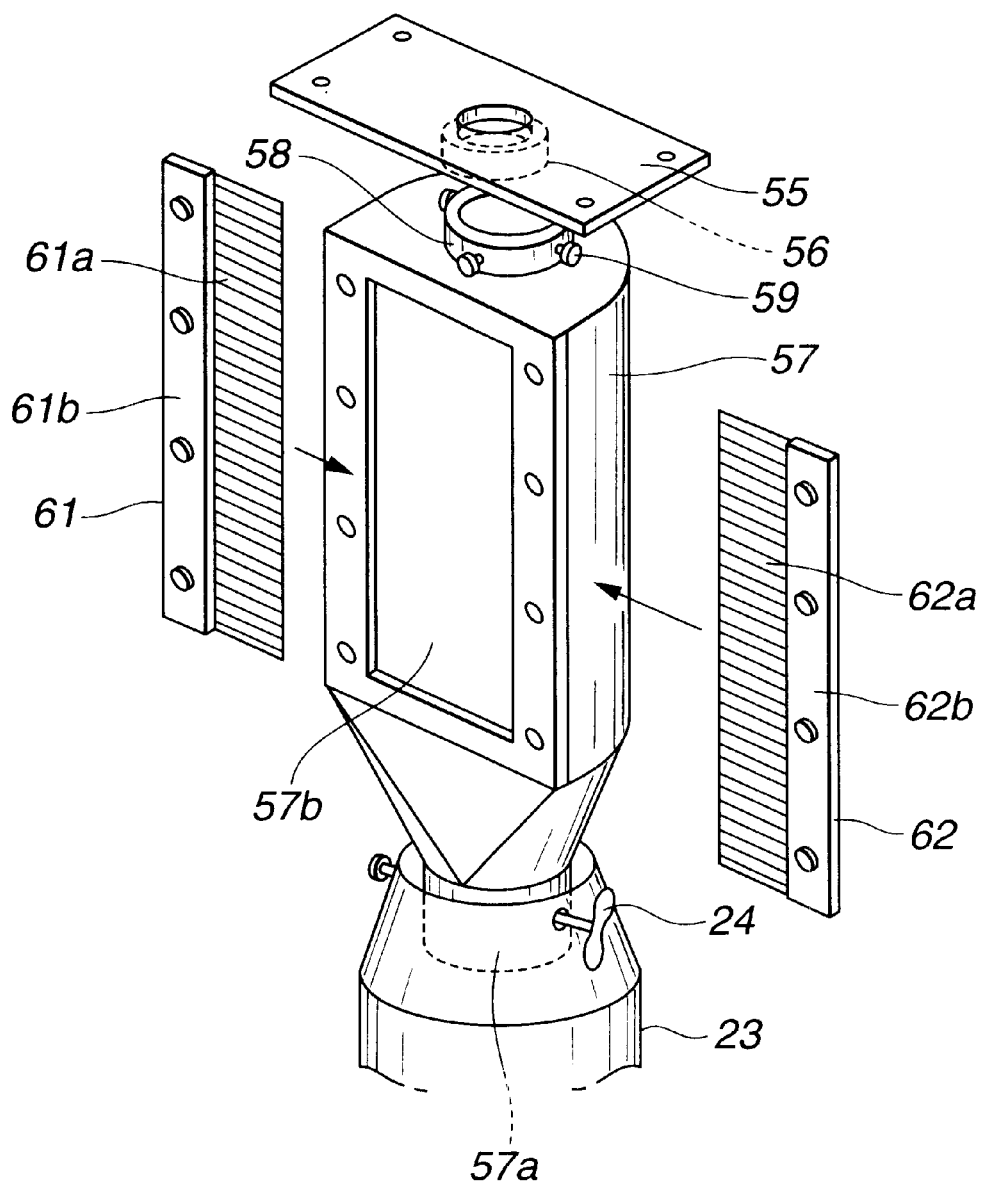
Figure 25:
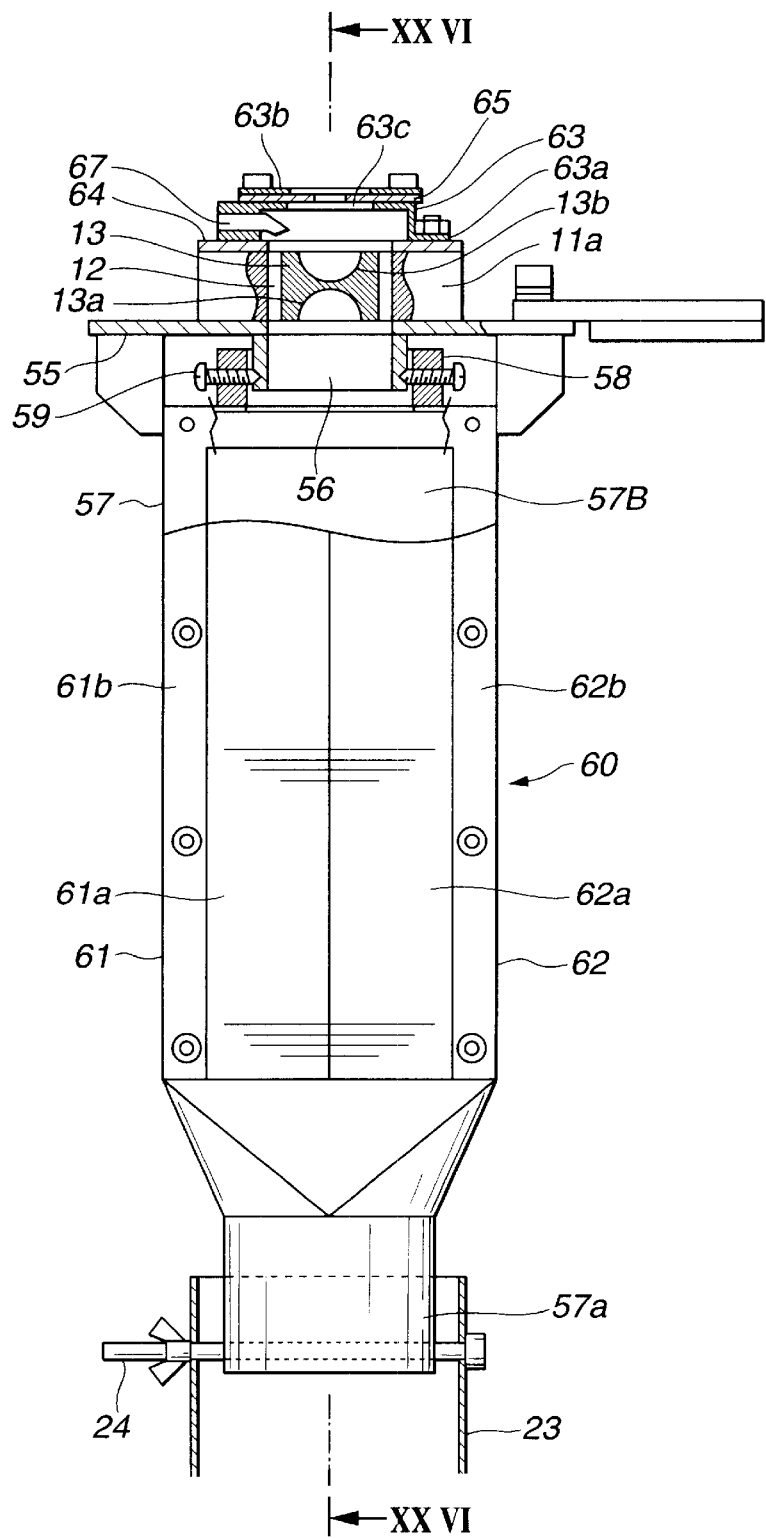
Figure 26:
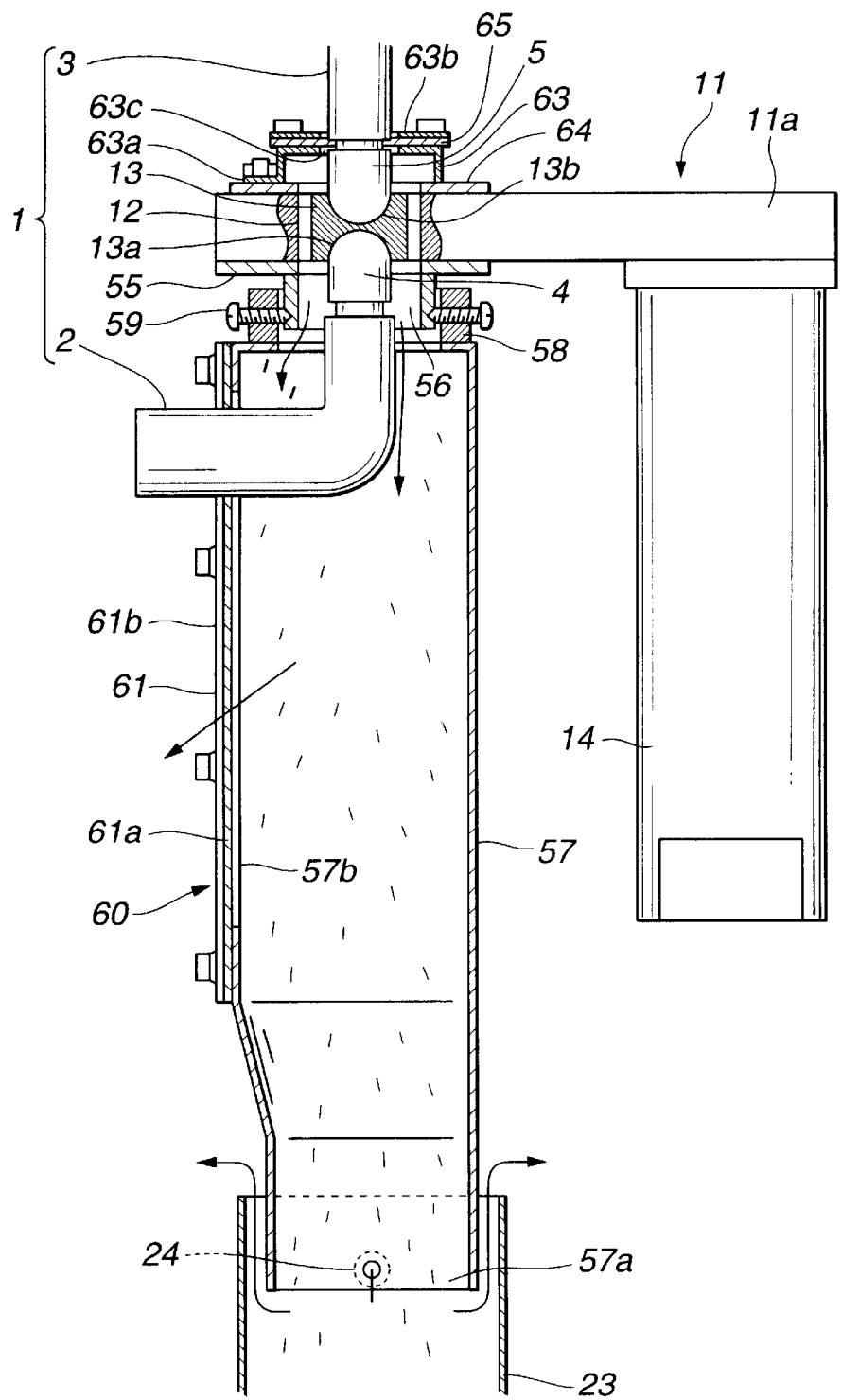

As shown in FIGS. 23 to 25, the ends of the brushes 61a and 62a of the brush units 61 and 62 are abutted against each other approximately at the center of the tip inserting port 57b so as to shield it.

Further, an upper chip capturing case 63 is mounted on the upper surface of the main body 11a. The upper chip capturing case 63 is disposed so as to surround the holder 12 that opens to the upper surface of the main body 11a.

As shown in FIG. 25, a flange 63a is formed on the bottom of the upper chip capturing case 63, and an upper surface shield member 65 is clamped and fixed to the upper surface thereof through an upper plate 63b. The flange 63a is fixedly disposed to a base plate 64, which is fixedly disposed to the main body 11a, through bolts.

The upper shield member 65 slidably contacts with the outside periphery of the gun arm 3 inserted into a tip inserting port 63c opened through the upper surface of the upper chip capturing case 63 so as to close the clearance between the outside periphery of the gun arm 3 and the tip inserting port 63c. The upper shield member 65 is composed of a flexible member such as a ring-shaped rubber plate, radially disposed brushes.

Note that the upper shield member 65 is not required to have air tightness because it is sufficient for the shield member 65 to prevent the chips generated when the electrode tip 5 is dressed from scattering to the outside from the tip inserting hole 63c.

Further, an air nozzle 67 for blowing air to the dressing body 13 is faced to the interior of the upper chip capturing case 63 to prevent the dressing body 13 from clogging.

In contrast, the upper end of the chip collection vessel 23 is suspended to the chip ejection port 57a formed through the bottom of the lower chip capturing case 57 through the suspension bolt 24. The pet bottle subjected to the predetermined processing may be diverted as the chip collection vessel 23 similarly to the first embodiment.

Next, processes for dressing the electrode tips using an electrode tip dressing apparatus arranged as described above will sequentially be described.

First, the ring member 58, which projects from the upper surface of the lower chip capturing case 57, is fitted on the boss 56 disposed to the support plate 55 which is fixedly disposed to the lower surface of the main body 11a.

Next, the lower chip capturing case 57 is positioned and fixed by tightening the screws 59 which are threaded into the ring member 58 from the four directions and by pressing the ends thereof against the boss 56 in a state in which the front surface of the lower chip capturing case 57, that is, the surface thereof through which the tip inserting port 57b is opened is directed in the advancing direction of the gun arm 2.

When the ends of the electrode tips 4 and 5 are to be dressed after the completion of a spot welding work using the welding robot, the first and second gun arms 2 and 3 disposed to the welding gun 1 are moved in a direction of the main body 11a by the welding robot.

Next, the first gun arm 2 is inserted into the lower chip capturing case 57 mounted on the lower surface of the dresser main body 11a through the tip inserting port 57b thereof and faced to the interior of the lower chip capturing case 57.

At this time, the gun arm 2 can be smoothly introduced into the lower chip capturing case 57 because the tip inserting port 57b of the lower chip capturing case 57 is previously adjusted in the advancing direction of the gun arm 2.

As a result, an allowance can be provided with the direction of the lower chip capturing case 57 when it is installed. That is, it is not necessary to check the advancing directions of the gun arms 2 individually and to design the lower chip capturing cases 57 so that the tip inserting ports 57b thereof face the gun arms 2, respectively, which not only increases a design freedom but also can unify the standard of the lower chip capturing case 57. Thus, it is possible to make the lower chip capturing case 57 to be convenient for the user.

The tip inserting port 57b is shielded with the brushes 61a and 62a extending from the right and left sides thereof, and when the first gun arm 2 is inserted into the tip inserting port 57b, the brushes 61a and 62a are elastically deformed along the outside periphery of the first gun arm 2 and closes the periphery thereof.

Then, the axial center of the electrode tip 4 disposed at the end of the first gun arm 2 is aligned with the central axis of the dressing body 13 held by the holder 12 provided with the main body 11a. At this time, since the electrode tip 4 is disposed coaxially with the electrode tip 5 disposed at the end of the second gun arm 3, the axial center of the electrode tip 5 is also aligned with the central axis of the dressing body 13.

Thereafter, both the gun arms 2 and 3 are moved to cause both the electrode tips 4 and 5 to relatively approach to each other. Thus, first, the electrode tip 5 disposed at the end of the second gun arm 3 is inserted into the tip inserting port 63c opened through the upper surface of the upper chip capturing case 63. The upper flexible shield member 65 is disposed on the upper surface of the tip inserting port 63c, and the outside periphery of the second gun arm 3 is shielded with the upper shield member 65.

Then, when the electrode tips 4 and 5 further approach to each other, both the electrode tips 4 and 5 are abutted against the cutters 13a and 13b disposed to the lower and upper surfaces of the dressing body 13, respectively, and the dressing body 13 is clamped under pressure between both the electrode tips 4 and 5.

The dressing body 13 is rotated or swung by the servo motor 14 disposed to the main body 11a, and the air is blown toward the dressing body 13 from an air nozzle 67 faced to the interior of the upper chip capturing case 63. The air blown from the air nozzle 67 flows from the interior of the upper chip capturing case 63 to the lower chip capturing case 57 through the clearance formed between the holder 12 and the dressing body 13. And the air is blown out to the outside from the tip insertion port 57b of the lower chip capturing case 57 and from the chip ejection port 57a formed through the bottom thereof as shown by arrows in FIG. 26.

Note that the rotational drive (or swing drive) of the dressing body 13 and the air blowing from the air nozzle 67 may be started in synchronism with the detection of a state that the electrode tips 4 and 5 have approached or have been abutted against the dressing body 13.

Then, the chips, which are generated when the electrode tips 4 and 5 are dressed by polishing or grinding with the cutters 13a and 13b mounted on the dressing body 13, are introduced to the lower chip capturing chamber 57 by the air blown from the air nozzle 67 faced to the upper chip capturing case 63. At this time, the chips, which are introduced by the air leaked from the tip inserting port 57b, collide with the brushes 61a and 62a disposed to the tip inserting port 57b and are dropped into the lower chip capturing case 57.

The chips, which have been dropped into the lower chip capturing case 57, are deposited in the chip collection vessel 23 which is suspended to the chip ejection port 57a formed through the bottom of the lower chip capturing case 57.

When the electrode tips 4 and 5 have been dressed, the first and second gun arms 2 and 3 are separated by the welding robot from the main body 11a through an operation opposite to that when inserted and caused to wait for the next spot welding.

Reaching a predetermined amount, collected and reused are the chips accumulated in the chip collection vessel 23. Otherwise, these are collected and reused periodically.

As described above, according to this embodiment, the lower chip capturing case 57 is turnably (rotatably) supported by the main body 11a so that the surface thereof through which the tip inserting port 57b is opened can be fixed in a state in which the surface is directed to the advancing direction of the gun arm 2. Accordingly, the gun arm 2 can be smoothly introduced into the lower chip capturing case 57, which provides the allowance for the direction of the lower chip capturing case 57 when it is installed.

Therefore, not only the design freedom increases in the lower chip capturing case 57 but also the standardization thereof can be attained, whereby the lower chip capturing case 57 can be arranged to be convenient for the user.

Further, since the lower and upper surfaces of the dressing body 13 are surrounded with the lower and upper chip capturing case 57 and 63 and the electrode tips 4 and 5 are dressed in both the cases 57 and 63, the chips generated while the dressing operations are not dispersed to the outside and can be effectively collected in the chip collection vessel 23 and reused, whereby the chip reuse ratio can be improved.

In this case, since the air is utilized to prevent the dressing body 13 from clogging and the chips are positively introduced to the chip ejection port 57a of the lower chip capturing case 57, the chip collection efficiency can be more improved. Further, as an existing air blowing device can be utilized, the cost of equipments can be suppressed (reduced).

Further, since the tip inserting ports 57b and 63c into which the first and second gun arms 2 and 3 are inserted are shielded with the shield members 60 and 65, no chip is scattered to the outside, whereby the chips can be collected very effectively.

Figure 27:
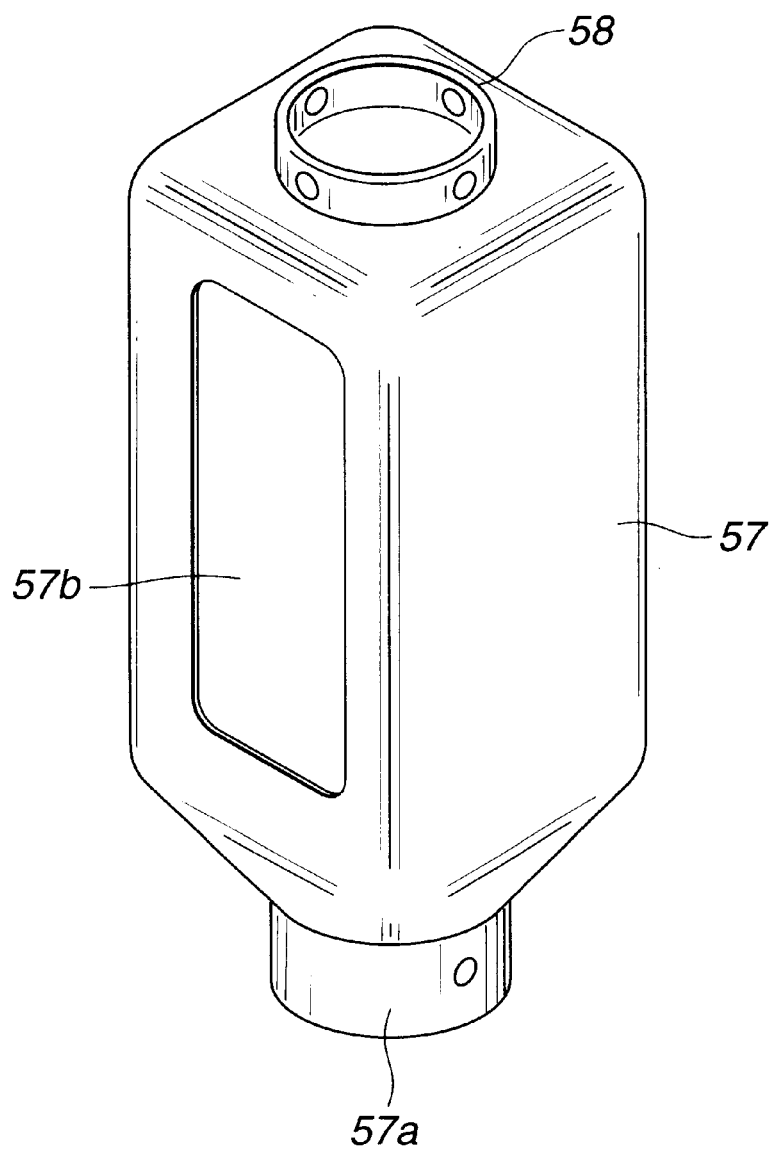

Incidentally, as shown in FIG. 27, since the lower chip capturing case 57 is arranged as the injection molded product or as the integrally molded product which is made by forming necessary portions such as the tip inserting ports to the blow-molded product by post processing, the weight of the lower chip capturing case 57 can be reduced and the structure thereof can be simplified as well as the economical efficiency thereof can be improved and the mass-production can be easily attained. At the same time, an electrode tip dressing apparatus can be more practically usably arranged by giving the highest priority to the breakage of the less expensive molded product in the occurrence of the collision of the apparatus due to a false teaching to the robot so that the adverse effect applied to the robot and the main body 11a can be minimized.

In this case, the lower chip capturing case 57 may be positioned and fixed in such a manner that a metal ring is inserted to or fitted on the ring member 58 and the ring member 58 is fixed to the boss 56 by screws through the metal ring.

Figure 28:
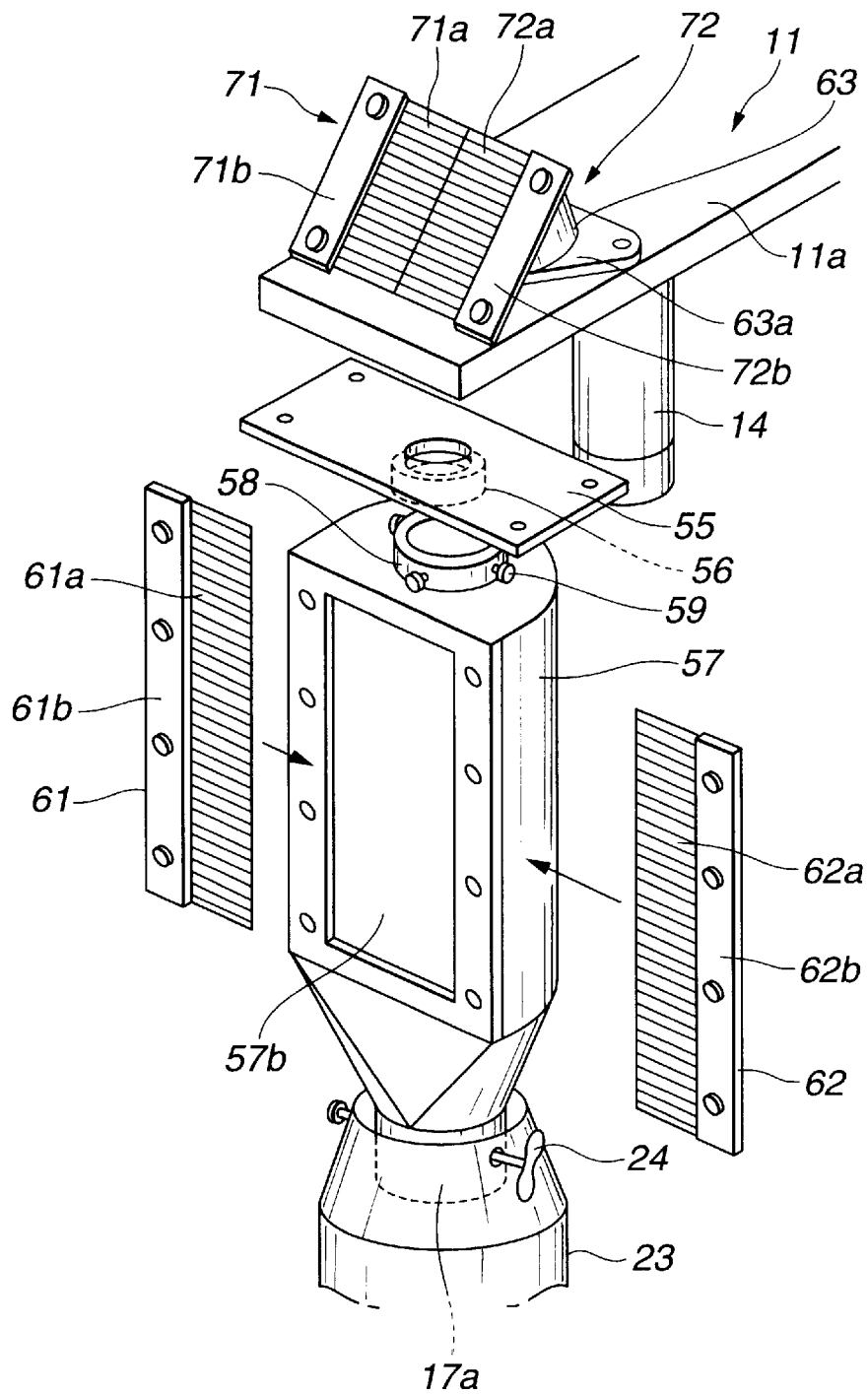
FIG. 28 is an exploded perspective view of the electrode tip dressing apparatus according to a sixth embodiment.

FIG. 28 shows a sixth embodiment of the present invention.

In this embodiment, a tip insertion port (not shown) is opened through the upper chip capturing case 63 in an inclining attitude, the brushes 71a and 72a of brush units 71 and 72 are disposed to the tip insertion port in confrontation with each other so as to joint at a center, and the roots of the brushes 71a and 72a are fixed by plates 71b and 72b.

Since the tip inserting hole is opened in an inclined state and shielded with the brushes 71a and 72a, the electrode tip 5 fixed at the end of the second gun arm 3 can be easily introduced into the upper chip capturing case 63 even if the stroke between the gun arms 2 and 3 is relatively short.

Figure 29:
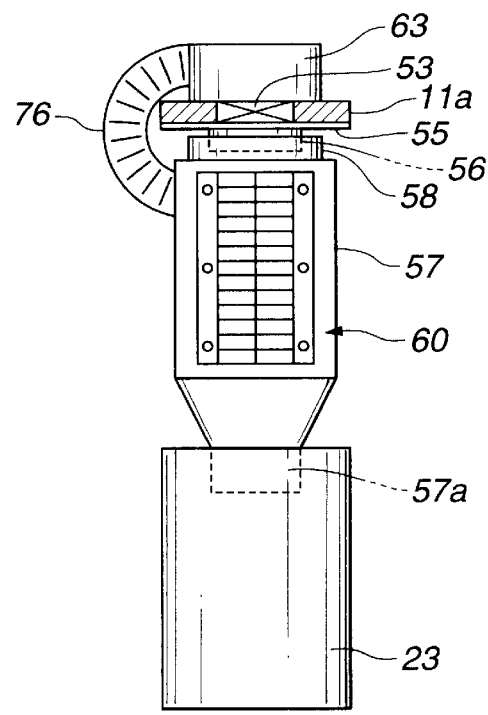
Figure 30:
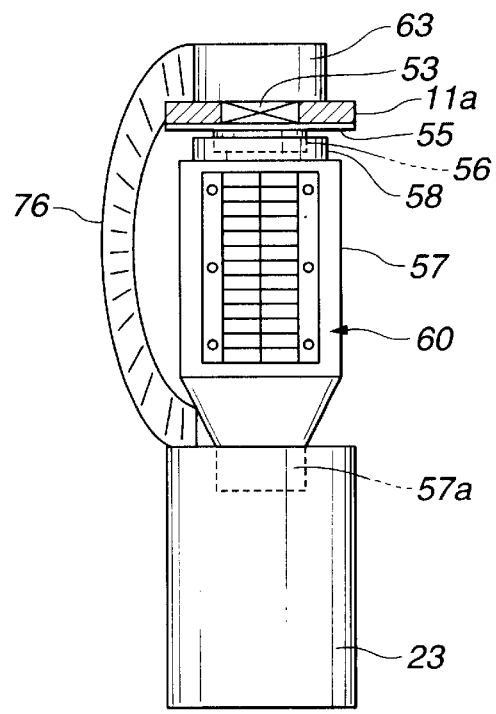

FIGS. 29 and 30 show a seventh embodiment of the present invention.

As shown in FIGS. 29 and 30, the interior of the upper chip capturing case 63 is communicated with the upper or lower portion of the lower chip capturing case 57 through a flexible chip ejection path 76 such as a flexible hose that can permit the lower chip capturing case 57 to turn. With this arrangement, the chips floating in the upper chip capturing case 63 can be promptly ejected to the lower chip capturing case 57 through chip ejection path 76 by the air blown from the air nozzle 67 in a dressing operation.

Since the chips floating in the upper side of the chip capturing case 63 are ejected to the lower chip capturing case 57 through the chip ejection path 76, the chips do not deposit on the dressing body and the drive mechanism connecting to the dressing body, whereby a malfunction in operation can be effectively avoided and the maintenance can be effectively carried out.

Note that, in this case, the upper surface of the lower chip capturing case 57, for example, may be turnably (or rotatably) connected to the lower surface of the dresser main body 11a through a radial bearing so that the lower chip capturing case 57 can be positioned by being pressed and fixed using a screw at one position.

The present invention is by no means limited to the aforementioned embodiments. For example, the shield members 16, 29, 60, and 65 need not be composed of the brushes and, any member such as a rubber plate may be used as long as it can shield the tip insertion ports 15b, 25a, and 57a while permitting the insertion and the removal of the gun arms 2 and 3 into and from the tip inserting ports 15b, 25a, and 57b as well as it has a restoring (reproduction) property.

Further, the chip collection vessel 23 may be disposed below the chip ejection ports 15a, 25d, and 57a disposed to the chip capturing cases 15, 25, and 57 and an ejection path may be connected to the chip ejection port 15a, 57a or 25d so as to drop the chips from the chip ejection port 15a, 57a, or 25d to the chip collection vessel 23 through the ejection path.

Having described the preferred embodiments of the invention referring to the accompanying drawings, it should be understood that the present invention is not limited to those embodiments and various changes and modifications thereof could be made without departing from the spirit or scope of the invention as defined in the appended claims.

As described above, according to the present invention, the chip collection ratio of the chips which are generated when the electrode tips are dressed by polishing or grinding can be increased, whereby the chip reusable ratio can be improved.

What is claimed is:

1. An electrode tip dressing apparatus for dressing a pair of electrode tips arranged in confrontation with each other, comprising:

a dressing body having upper and lower surfaces clamped under pressure by said pair of electrode tips for dressing said pair of electrode tips through a relatively sliding motion thereof with said electrode tips;

a chip capturing case for covering said dressing body and having a tip inserting port through which at least one of said electrode tips is inserted;

a shield member disposed to the tip inserting port of said chip capturing case; and a collection vessel disposed to an ejection port formed through the bottom of said chip capturing case.

2. An electrode tip dressing apparatus for dressing a pair of electrode tips arranged in confrontation with each other, comprising:

a dressing body having upper and lower surfaces clamped under pressure by said pair of electrode tips for dressing said pair of electrode tips through a relatively sliding motion thereof with said electrode tips;

a main body for holding said dressing body;

a chip capturing case for covering said dressing body and having a tip inserting port through which at least one of said electrode tips is inserted;

a shield member disposed to the tip inserting port of said chip capturing case;

a boss disposed on a lower surface of said main body; and a ring member fitted on said boss and fixedly disposed on an upper surface of said chip capturing case.

3. The electrode tip dressing apparatus according to claim 1, further comprising:

a communicating member for communicating an upper chamber and a lower chamber formed in said chip capturing case on the upper side and the lower side with respect to said dressing body, respectively.

4. The electrode tip dressing apparatus according to claim 1, wherein said shield member is formed in a brush shape so as to permit the insertion of one of said electrode tips by the elastic deformation thereof.

5. The electrode tip dressing apparatus according to claim 1, further comprising:

an air nozzle faced to said chip capturing case for introducing the chips into the lower portion of said chip capturing case.

* * * * *